(12) United States Patent
Kaneko

(10) Patent No.: US 10,985,627 B2
(45) Date of Patent: Apr. 20, 2021

(54) VEHICLE MAIN ELECTRIC MOTOR

(71) Applicant: MITSUBISHI ELECTRIC CORPORATION, Tokyo (JP)

(72) Inventor: Kenta Kaneko, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 375 days.

(21) Appl. No.: 16/087,784

(22) PCT Filed: Mar. 30, 2016

(86) PCT No.: PCT/JP2016/060520
§ 371 (c)(1),
(2) Date: Sep. 24, 2018

(87) PCT Pub. No.: WO2017/168656
PCT Pub. Date: Oct. 5, 2017

(65) Prior Publication Data
US 2020/0076267 A1 Mar. 5, 2020

(51) Int. Cl.
*H02K 5/173* (2006.01)
*B61C 3/00* (2006.01)
(Continued)

(52) U.S. Cl.
CPC ............ *H02K 5/1732* (2013.01); *B61C 3/00* (2013.01); *F16C 19/49* (2013.01); *F16C 33/6696* (2013.01); *F16C 2326/10* (2013.01)

(58) Field of Classification Search
CPC ....... H02K 7/083; H02K 5/173; H02K 5/1732
See application file for complete search history.

(56) References Cited

U.S. PATENT DOCUMENTS 5,753,986 A * 5/1998 Ohtani .................. H02K 5/136
310/52
6,172,436 B1 * 1/2001 Subler ................. F16C 33/6662
29/898.11

FOREIGN PATENT DOCUMENTS

JP S58-038098 U1 3/1983
JP H08-086317 A 4/1996
(Continued)

OTHER PUBLICATIONS

International Search Report (PCT/ISA/210) dated Jun. 28, 2016, by the Japan Patent Office as the International Searching Authority for International Application No. PCT/JP2016/060520.
(Continued)

*Primary Examiner* — Dang D Le
(74) *Attorney, Agent, or Firm* — Buchanan Ingersoll & Rooney PC

(57) ABSTRACT

A vehicle main electric motor includes: a ring-shaped filling chamber, which is formed in contact with a ball bearing and a roller bearing in a direction of a rotation shaft, for filling with a semi-solid lubricant, and which has a central axis concentric with the rotation shaft; and a discharge section connected to the filling chamber, for inflow of the semi-solid lubricant from the filling chamber. A display member, which has a specific gravity lower than a specific gravity of the semi-solid lubricant, is arranged, in an interior of the discharge section, at an initial position that is a position not reached by the semi-solid lubricant during an initial greasing. The discharge section has a retaining part for retaining, at a movement position that is a determined position within the discharge section, the display member moving in a greasing direction due to pressure of the semi-solid lubricant during a supplemental greasing. At least a portion of visible (Continued)

light from the exterior reaches at least a portion of the movement position.

20 Claims, 24 Drawing Sheets

(51) Int. Cl.
*F16C 19/49* (2006.01)
*F16C 33/66* (2006.01)

(56) References Cited

FOREIGN PATENT DOCUMENTS

| | | | |
|---|---|---|---|
| JP | 2000-199598 | A | 7/2000 |
| JP | 2000-274593 | A | 10/2000 |
| JP | 2004-162847 | A | 6/2004 |

OTHER PUBLICATIONS

Written Opinion (PCT/ISA/237) dated Jun. 28, 2016, by the Japan Patent Office as the International Searching Authority for International Application No. PCT/JP2016/060520.

\* cited by examiner

VEHICLE MAIN ELECTRIC MOTOR

TECHNICAL FIELD

The present disclosure relates to a vehicle main electric motor for which supplemental greasing is possible.

BACKGROUND ART

Periodic inspection of a main electric motor of an electric railway vehicle is mandatory. Generally every four years the main electric motor is removed from the vehicle, the main electric motor is disassembled, and bearing components are cleaned and then refilled with grease. In recent years in order to lower maintenance costs, a greasing port is provided for supplying grease to the bearing components, greasing is performed four years after the beginning of use, and re-greasing is performed eight years after the beginning of use.

Whether greasing is previously performed cannot be determined on the basis of external appearance of the main electric motor. Thus a determination of whether greasing is previously performed is made on the basis of a maintenance work management ledger and the like. If the record in the maintenance work management ledger is erroneous, then a lubrication failure may occur due to an excessive or insufficient amount of grease.

A bearing device disclosed in Patent Literature 1 is equipped with a lubricating oil introduction tube that increases flowability of grease by heating grease supplied to an inner tubular space of a double-tubular structure, using an operation fluid sealed in an outer tubular space of the double-tubular structure. This bearing device is equipped with an oil level gauge in the lubricating oil introduction tube, thereby enabling checking of the remaining amount of grease.

CITATION LIST

Patent Literature

Patent Literature 1: Unexamined Japanese Patent Application Kokai Publication No. H08-086317

SUMMARY OF INVENTION

Technical Problem

The bearing device disclosed in Patent Literature 1 requires a lubricating oil introduction tube that has a double-tubular structure, and the structure is complex.

In consideration of the aforementioned circumstances, an objective of the present disclosure is to simplify a structure for indicating status of greasing of the vehicle main electric motor.

Solution to Problem

In order to attain the aforementioned objective, the vehicle main electric motor of the present disclosure is equipped with a bearing, a filling chamber, a greasing tube, and a discharge section. The bearing is disposed around a rotation shaft for transferring power to wheels and driving a vehicle. The filling chamber is formed in proximity to the bearing and along the rotation shaft, for filling by a semi-solid lubricant. The filling chamber is ring-shaped and has a central axis concentric with the rotation shaft. The semi-solid lubricant loaded into a greasing port formed at one end of the greasing tube is supplied from another end of the greasing tube to the bearing and the filling chamber. The discharge section is connected to the filling chamber, and the semi-solid lubricant flows into the discharge section from the filling chamber. In the interior of the discharge section, at an initial position that is a position not reached by the semi-solid lubricant during an initial greasing, a display member is arranged that has a specific gravity lower than a specific gravity of the semi-solid lubricant. The discharge section has a retaining part for, when the display member is moved in the greasing direction by pressure of semi-solid lubricant during supplemental greasing using the semi-solid lubricant subsequent to the initial greasing, stopping the display member at a determined movement position within the discharge section. At least a portion of visible light from the exterior reaches at least a portion of the movement position.

Advantageous Effects of Invention

According to the present disclosure, in the discharge section connected to the filling chamber, a display member is arranged that, due to pressure of the semi-solid lubricant during supplemental greasing by supplying the semi-solid lubricant, moves in the greasing direction in the discharge section, and thus the structure for indicating the status of greasing of the vehicle main electric motor can be simplified.

DESCRIPTION OF EMBODIMENTS

Figure 1:
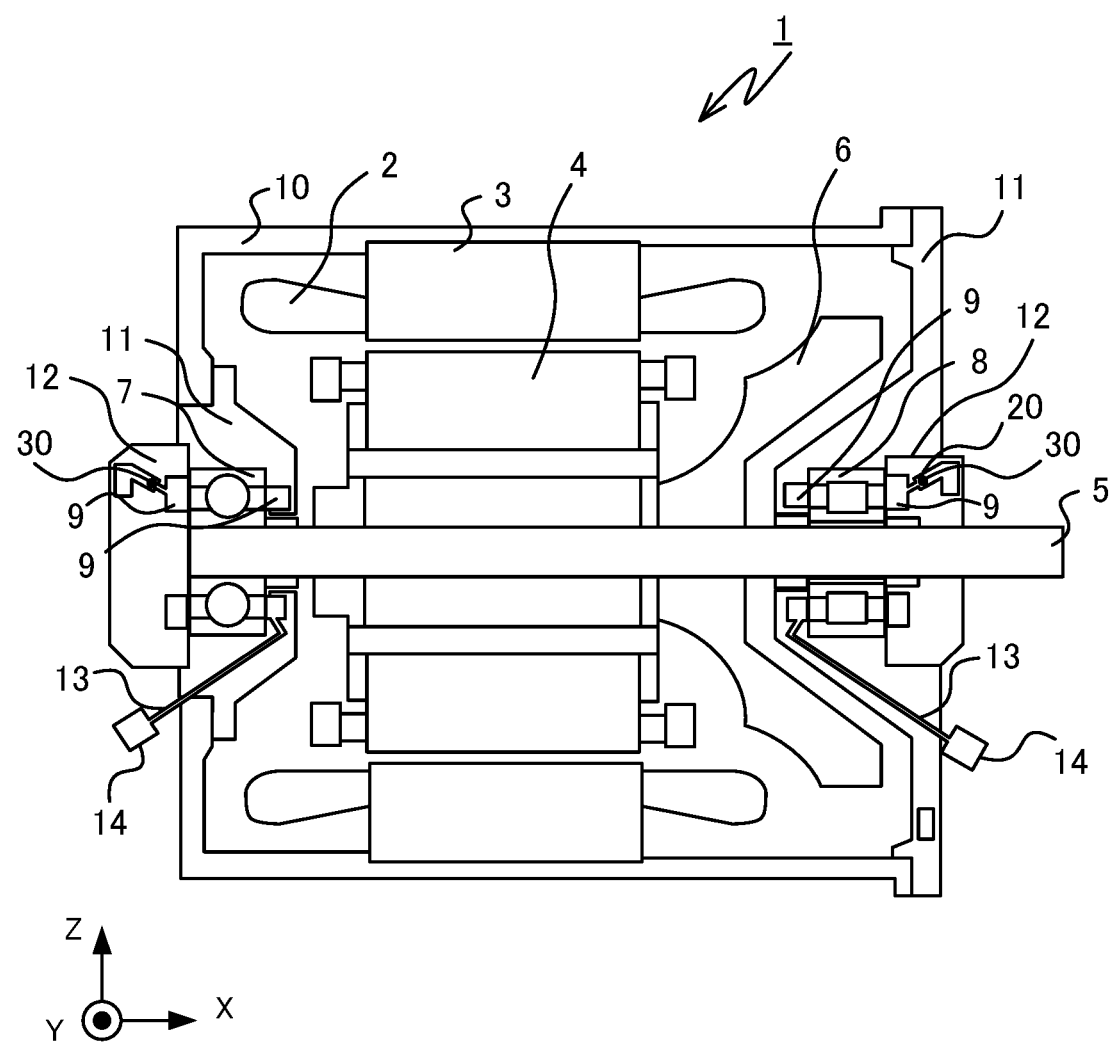
FIG. 1 is a cross-sectional view of a vehicle main electric motor according to Embodiment 1 of the present disclosure.

Embodiments of the present description are described below in detail with reference to drawings. In the drawings, components that are the same or equivalent are assigned the same reference signs.

Embodiment 1

FIG. 1 is a cross-sectional view of a vehicle main electric motor according to Embodiment 1 of the present disclosure. The vehicle main electric motor 1 (referred to hereinafter as the "main electric motor"), is mounted on a vehicle such as a railway vehicle. FIG. 1 is a cross-sectional view of the main electric motor 1 taken along a plane perpendicular to a travel direction of the vehicle. In the example of FIG. 1, the vertical direction is taken to be the Z-axis direction, the travel direction of the vehicle is taken to be the Y-axis direction, and the transverse direction of the vehicle, which is the tie direction if the vehicle is a railway vehicle, is taken to be the X-axis direction. The vehicle travels in the positive Y-axis direction or the negative Y-axis direction. A vehicle body of the vehicle is positioned further in the positive Z-axis direction than the main electric motor 1.

The main electric motor 1 includes a stator 3 that has a coil 2; a rotor 4 facing the stator 3; a rotation shaft 5 arranged so as to pass in the X-axis direction through the center of the rotor 4, for transmitting rotation of the rotor 4 to the exterior of the main electric motor 1; a fan 6 attached to the rotation shaft 5 so as to rotate together with the rotor 4; and a ball bearing 7 and a roller bearing 8 that support the rotation shaft 5. A ring-shaped filling chamber 9, having a central axis concentric with the rotation shaft 5, is formed in the X-axis direction contact with each of the ball bearing 7 and the roller bearing 8. The main electric motor 1 is equipped with a cylindrical frame 10 having a central axis concentric with the rotation shaft 5 and enclosing the stator 3 and the rotor 4, a bearing bracket 11 rotatably supporting the rotation shaft 5, a bearing cap 12 having the filling chamber 9 formed therein and positioned nearer the exterior of the main electric motor 1 than the ball bearing 7, and a bearing cap 12 having the filling chamber 9 formed therein and positioned nearer the exterior of the main electric motor 1 than the roller bearing 8.

The main electric motor 1 is further equipped with a greasing tube 13 that has a greasing port 14 formed in one end thereof. The semi-solid lubricant loaded from the greasing port 14 formed at one end of the greasing tube 13 is supplied from the other end of the greasing tube 13 to the ball bearing 7, the roller bearing 8, and the filling chamber 9. In Embodiment 1, the other end of the greasing tube 13 is connected to the filling chamber 9 located nearer to the center of the main electric motor 1 than the ball bearing 7 or to the filling chamber 9 located nearer to the center of the main electric motor 1 than the roller bearing 8. The greasing tube 13 may be attached to the main electric motor 1 in any direction. For the main electric motor 1 mounted on a railway vehicle, maintenance work on the main electric motor 1 is performed from a pit provided below the rails, and thus the greasing tube 13 is attached so as to position the greasing port 14 downward in the Z-axis direction.

During assembly of the main electric motor 1, a fixed amount of the semi-solid lubricant is supplied to the filling chamber 9 and the spaces of the ball bearing 7 and the roller bearing 8. During assembly of the main electric motor 1, the filling chamber 9 is, for example, approximately half filled with the semi-solid lubricant. The semi-solid lubricant has a viscosity greater than or equal to a fixed value, and does not move due to gravity or weight of the semi-solid lubricant. In Embodiment 1, grease is used as the semi-solid lubricant.

The main electric motor 1 is further equipped with a discharge section 20 connected to the filling chamber 9. Within the discharge section 20, at an initial position that is a position that the grease does not reach during an initial greasing, a display member 30 is provided that has a specific gravity lower than a specific gravity of the grease. Greasing status of the ball bearing 7 and the roller bearing 8 of the main electric motor 1 is visually confirmable from the outside when the display member 30 is moved in the greasing direction by pressure of the grease during use of grease for a supplemental greasing performed after the initial greasing.

Figure 2:
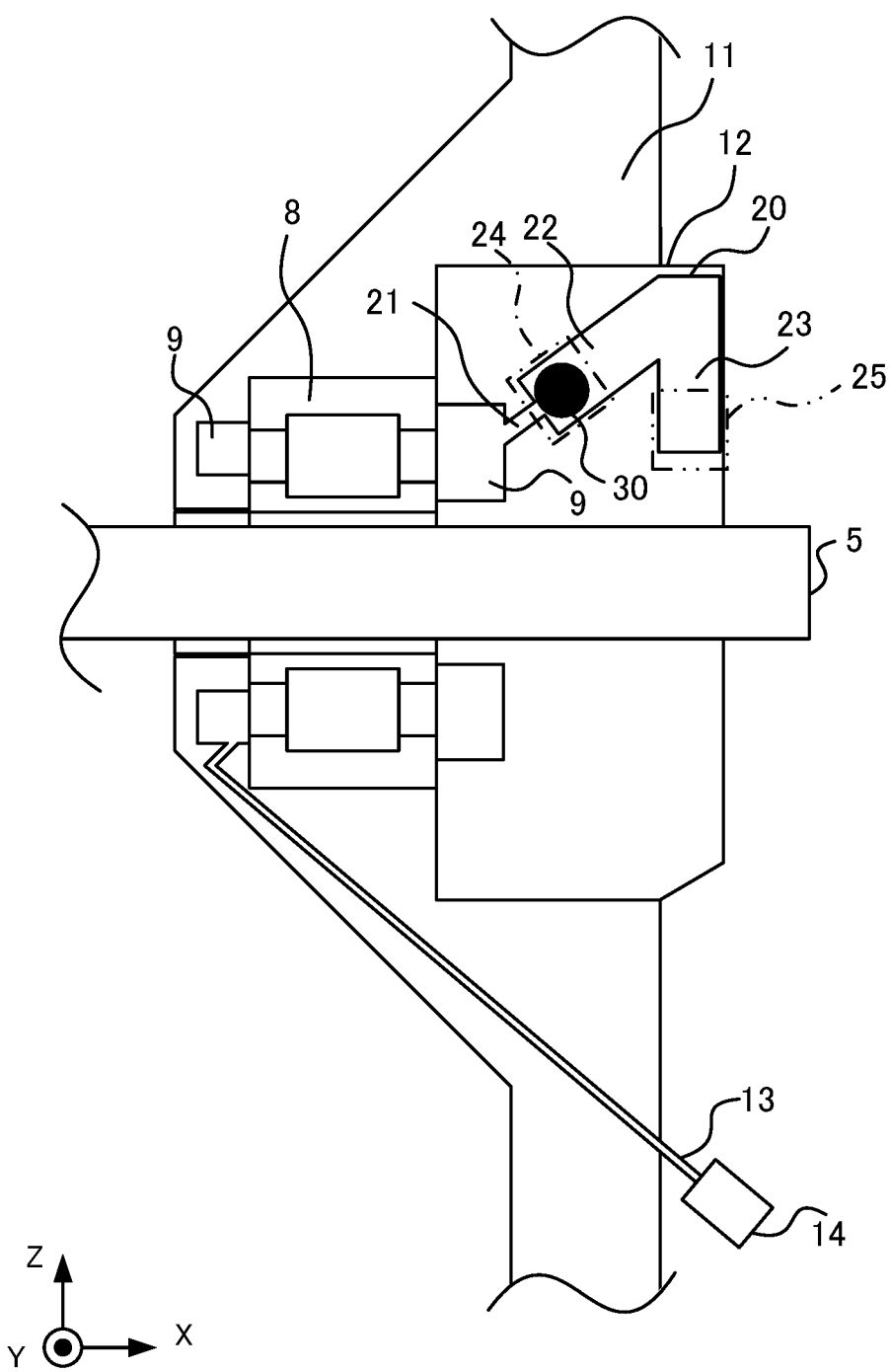
FIG. 2 is a partial cross-sectional view of the vehicle main electric motor according to Embodiment 1.
Figure 3:
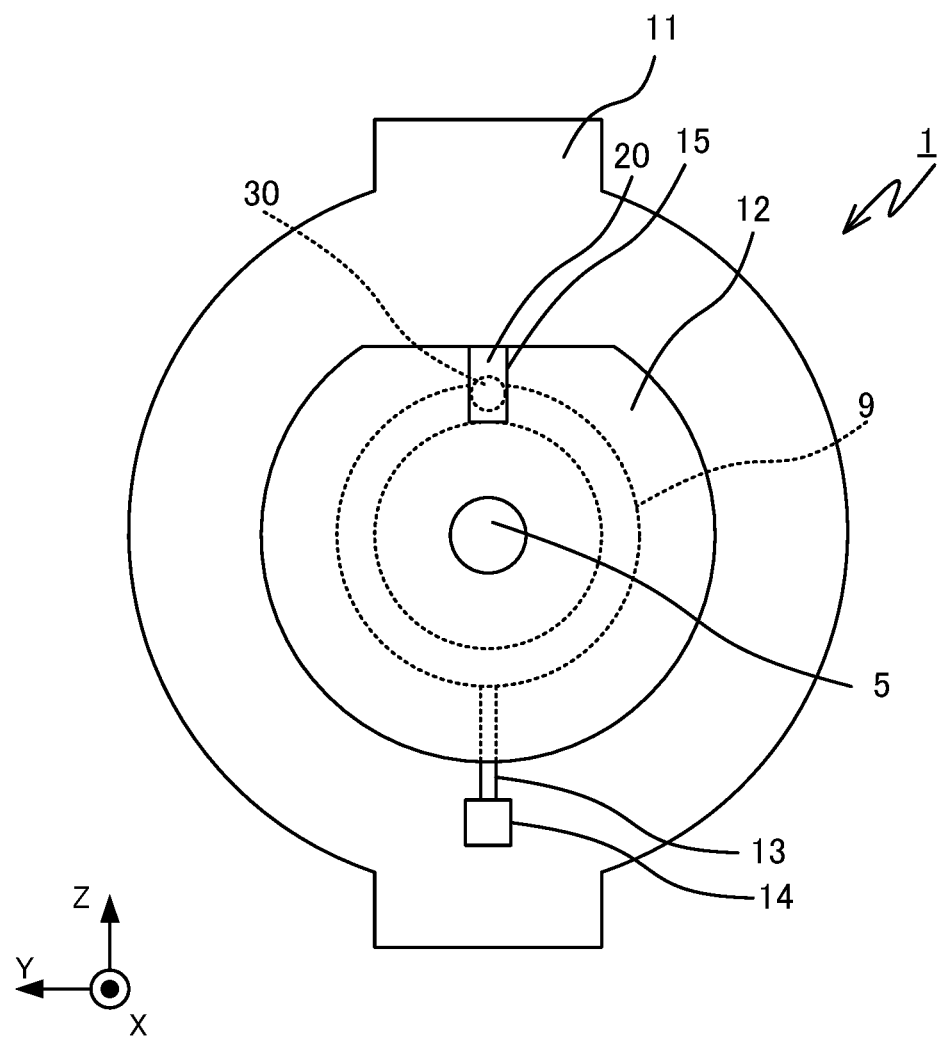
FIG. 3 is a side view of the vehicle main electric motor according to Embodiment 1.

FIG. 2 is a partial cross-sectional view of the vehicle main electric motor according to Embodiment 1. FIG. 2 is a magnified view of part of FIG. 1. FIG. 3 is a side view of the vehicle main electric motor according to Embodiment 1. FIG. 3 is a view of the main electric motor 1 as seen from the positive X-axis direction side. The structure for indicating the greasing status of the ball bearing 7 and the structure for indicating the greasing status of the roller bearing 8 are the same, and thus details of just the structure for indicating the greasing status of the ball bearing 8 are described in detail.

In Embodiment 1, the discharge section 20 is connected to a position within the filling chamber 9 nearer to the vehicle than the rotation shaft 5. Grease is supplied into the filling chamber 9 from a position that is axially symmetric, relative to the rotation shaft 5, with respect to the position of connection of the discharge section 20 to the filling chamber 9. In the example of FIGS. 2 and 3, the discharge section 20 is connected to the Z-axis direction uppermost portion of the interior of the filling chamber 9. Further, in the example of FIGS. 2 and 3, grease is supplied into the filling chamber 9 from the Z-axis direction bottommost portion of the filling chamber 9.

In Embodiment 1, the discharge section 20 is equipped with a first discharge tube 21 for which diameter of a cross section perpendicular to the greasing direction is smaller than diameter of such a cross section of the display member 30, one end is connected to the filling chamber 9, and a Z-axis direction position of the one end is lower than a Z-axis direction position of the other end. The discharge section 20 is further equipped with a second discharge tube 22 for which diameter of a cross section perpendicular to the greasing direction is at least as large as such a cross section of the display member 30, one end is connected to the first discharge tube 21, and a Z-axis direction position of the one end is lower than a Z-axis direction position of the other end. The discharge section 20 is further equipped with a third discharge tube 23 for which diameter of a cross section perpendicular to the greasing direction is at least as large as diameter of such a cross section of the display member 30, one end is connected to the second discharge tube 22, and a Z-axis direction position of the one end is higher than a Z-axis direction position of the other end. Shape of the third discharge tube 23 in a cross section perpendicular to the rotation shaft 5 extends toward the center of the rotation shaft 5.

The display member 30 is arranged at an initial position 24 that is the position of contact between the first discharge tube 21 and the second discharge tube 22. During supplying of grease for the initial greasing, the grease does not reach the initial position 24. Among both ends of the third discharge tube 23, a movement position 25 is at the end that does not contact the second discharge tube 22. The third discharge tube 23 is a retaining part that retains at the movement position 25 the display member 30 that moves in the greasing direction during supplying of grease for the supplemental greasing. A display window 15 is formed in the bearing cap 12. The display window 15 and a portion of the third discharge tube 23 facing the display window 15 are formed of a material that transmits at least a portion of visible light, and the moving of the display member 30 arranged within the discharge section 20 is visually recognizable from the exterior of the main electric motor 1. For example, if the display member 30 is at the initial position 24 as illustrated in FIGS. 2 and 3 when the maintenance worker looks at the display window 15, the maintenance worker, due to an inability to visually recognize the display member 30 through the display window 15, can determine that the supplemental greasing is not performed.

Figure 4:
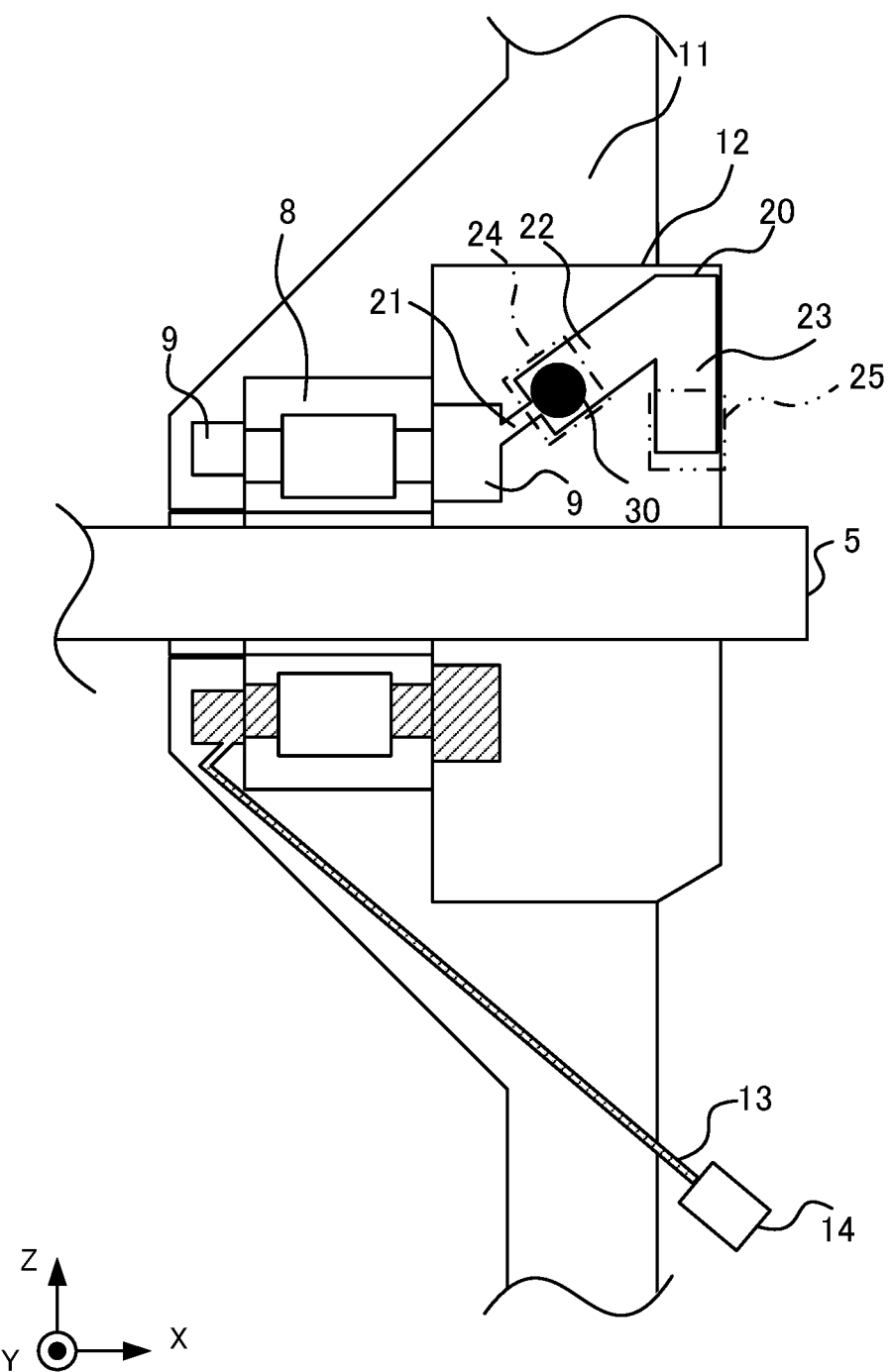
FIG. 4 is a drawing illustrating an example of an initial greasing of the vehicle main electric motor according to Embodiment 1.
Figure 5:
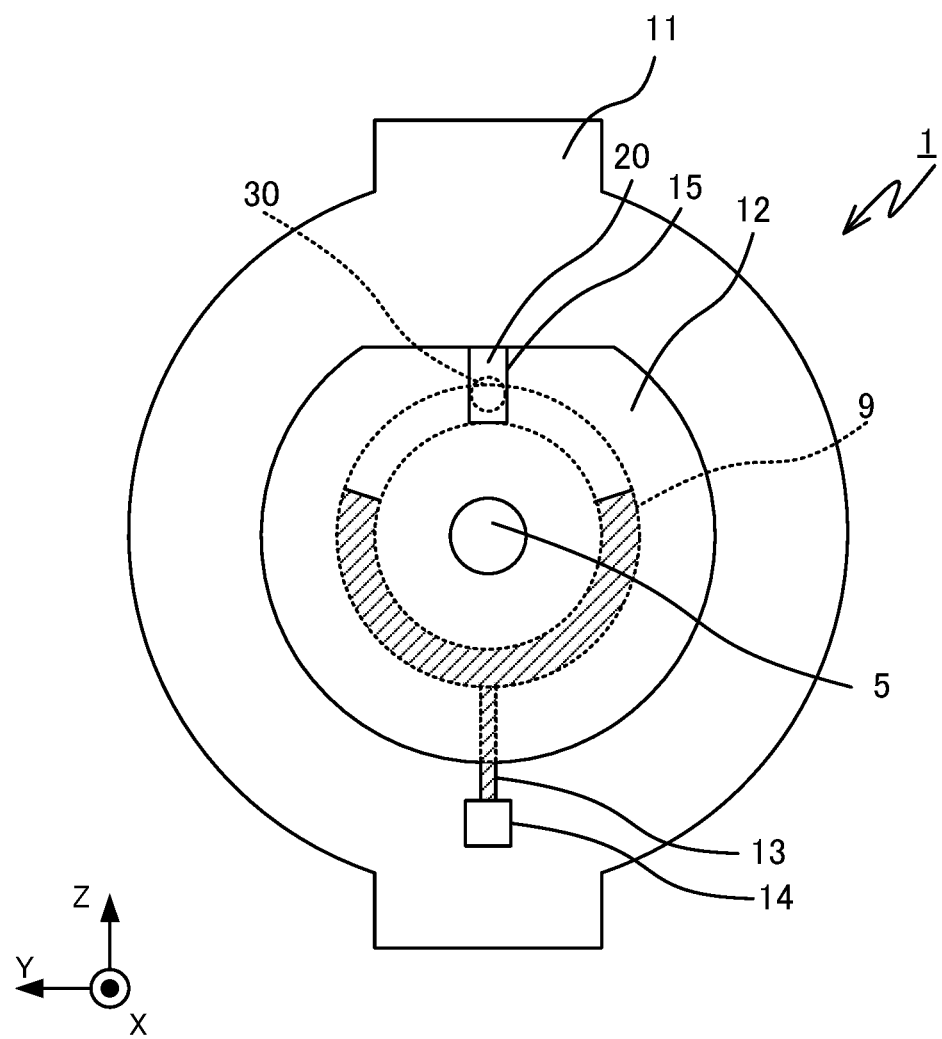
FIG. 5 is another drawing illustrating the example of the initial greasing of the vehicle main electric motor according to Embodiment 1.

FIGS. 4 and 5 are drawings illustrating an example of an initial greasing of the vehicle main electric motor according to Embodiment 1. The grease is illustrated by the portions indicated by tilted lines. As illustrated in FIGS. 4 and 5, the grease does not reach the initial position 24 during the initial greasing, and thus the display member 30 is positioned at the initial position 24, and the display member 30 is not visually recognizable through the display window 15. Due to inability to visually recognize the display member 30, the maintenance worker can determine that there is no performance of the supplemental greasing.

Figure 6:
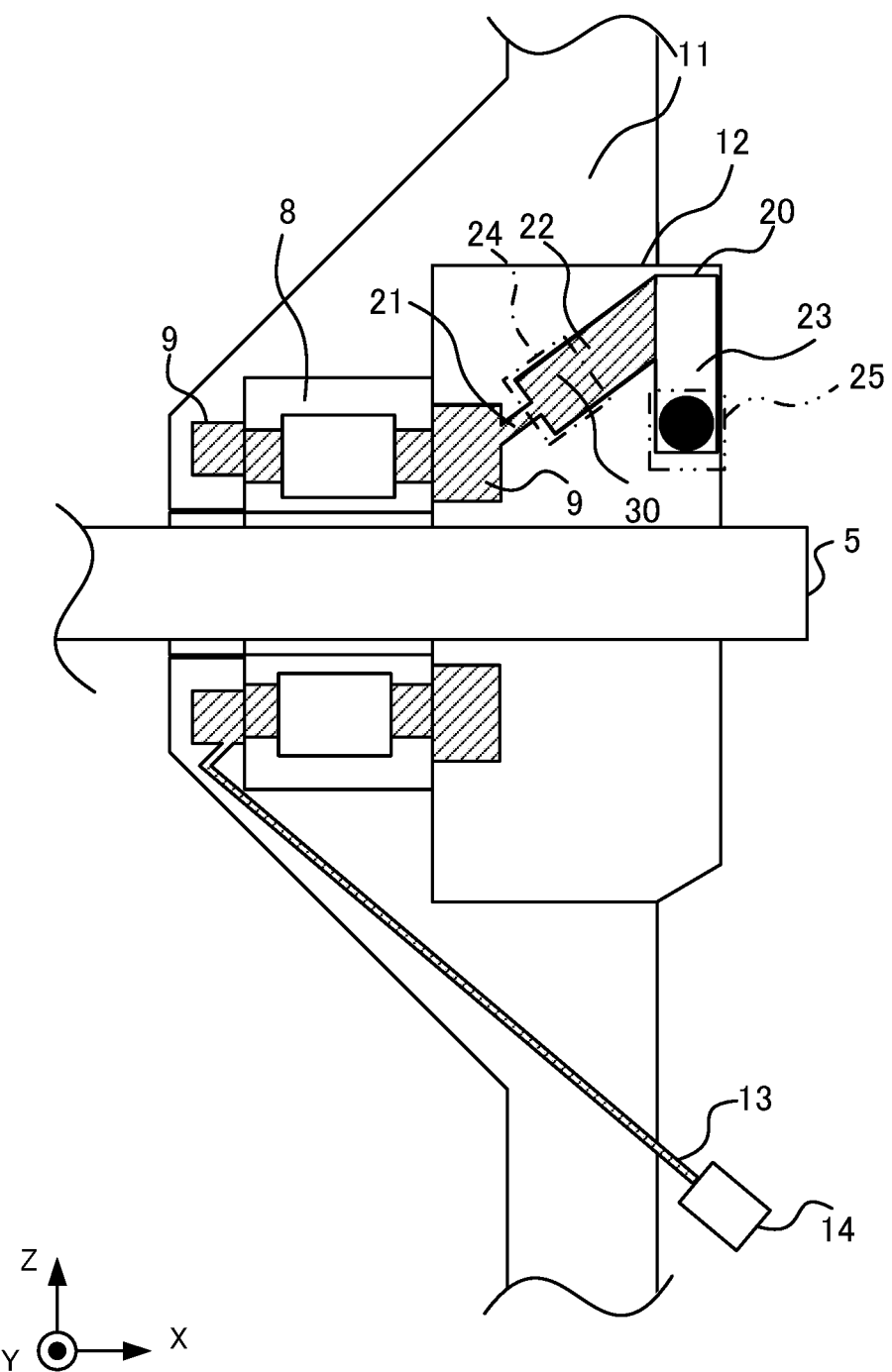
FIG. 6 is a drawing illustrating an example of a supplemental greasing of the vehicle main electric motor according to Embodiment 1.
Figure 7:
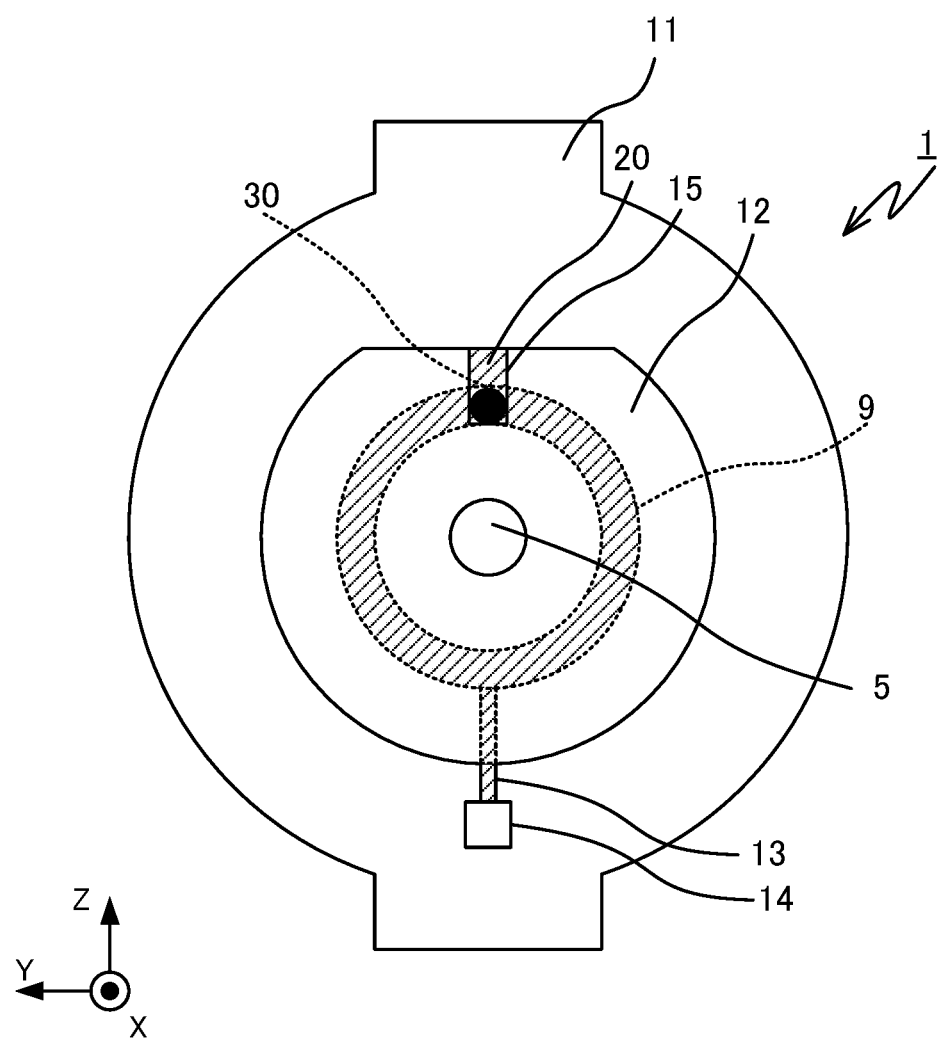
FIG. 7 is another drawing illustrating the example of the supplemental greasing of the vehicle main electric motor according to Embodiment 1.

FIGS. 6 and 7 are drawings illustrating an example of a supplemental greasing of the vehicle main electric motor according to Embodiment 1. When the filling chamber 9 is entirely filled with grease due to the supplemental greasing and the grease further entirely fills the first discharge tube 21 and the second discharge tube 22, the grease pushes the display member 30 into the third discharge tube 23. The display member 30 pushed into the third discharge tube 23 falls due to gravity and reaches the movement position 25. When the display member 30 reaches the movement position 25, as illustrated in FIGS. 6 and 7, the display member 30 is visually recognizable through the display window 15. Due to the ability to visually recognize the display member 30, the maintenance worker can determine that there is prior performance of the supplemental greasing.

Figure 8:
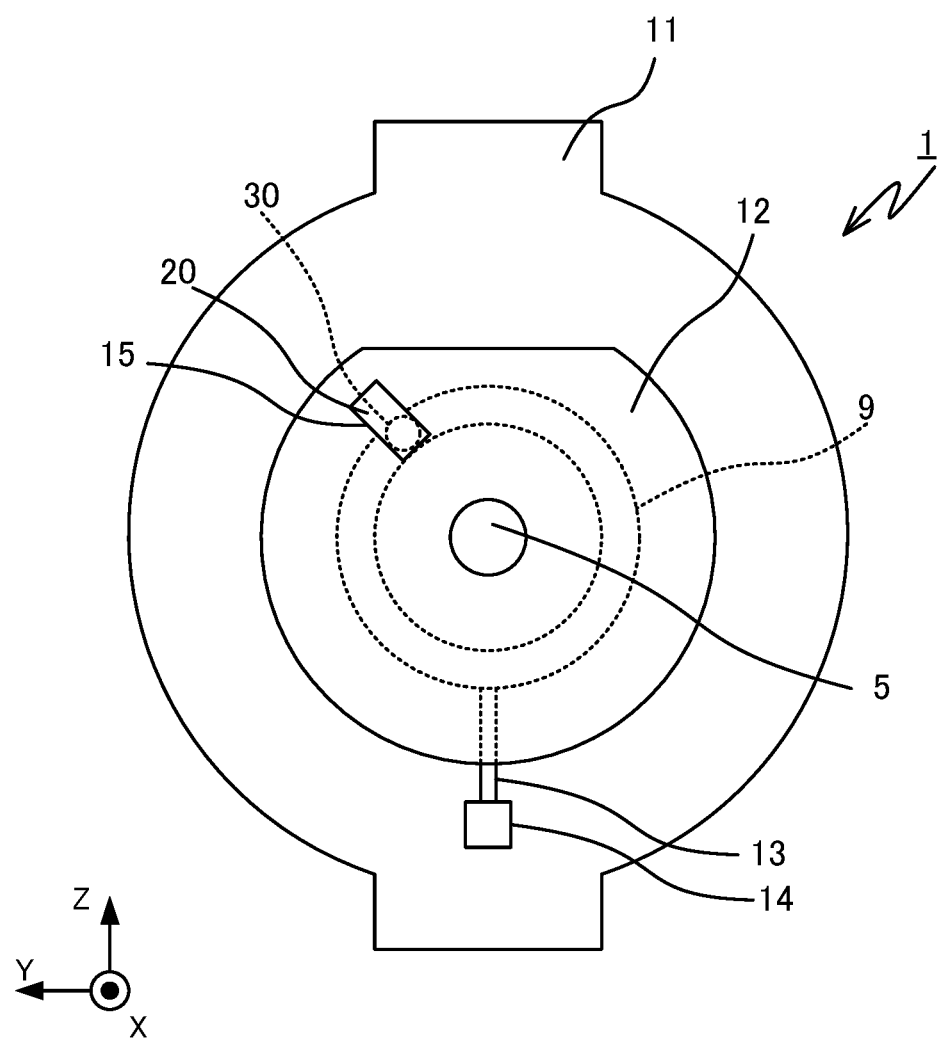
FIG. 8 is a side view of a modified example of the vehicle main electric motor according to Embodiment 1.

The position of connection of the discharge section 20 to the filling chamber 9 is not limited to the aforementioned example. FIG. 8 is a side view of a modified example of the vehicle main electric motor according to Embodiment 1. The position of connection of the discharge section 20 to the filling chamber 9 is not limited to the Z-axis direction uppermost portion, and as illustrated in FIG. 8, this position may be closer to the vehicle than the rotation shaft 5 and lower than the Z-axis direction uppermost portion. In the example of FIG. 8, grease is used to fill the filling chamber 9 from the Z-axis direction lowermost portion. Due to connection of the discharge section 20 to the position, within the filling chamber 9 as illustrated in FIG. 8, that is nearer to the vehicle than the rotation shaft 5 and is below the Z-axis direction uppermost portion, the display member 30 is visually recognizable through the display window 15 prior to the grease entirely filling the filling chamber 9. Due to the ability to visually recognize the display member 30 prior to the grease entirely filling the filling chamber 9, excessive greasing, that is, excess supplying of grease, can be suppressed. Further the determination can be made on the basis of the count of greasing operations in accordance with a vehicle travel distance or a number of years of operation of the vehicle, and thus insufficient greasing can be suppressed.

In the aforementioned manner per the main electric motor 1 according to Embodiment 1 of the present disclosure, the discharge section 20 connected to the filling chamber 9 is equipped with the display member 30 that moves in the greasing direction during supplying of grease for the supplemental greasing, and thus providing of the lubricating oil introduction tube having the double-tubular structure is not required, and the structure for indicating the status of greasing of the main electric motor 1 can be simplified.

Embodiment 2

The main electric motor 1 according to Embodiment 2 is equipped with multiple discharge sections 20 that have mutually different timings for the arrival of the display member 30 at the movement position 25 due to the supplemental greasing. The position of connection of the discharge section 20 to the filling chamber 9 can be determined as desired in accordance with a position where filling of grease begins to the filling chamber 9, the amount of grease filled in the filling chamber 9 during the initial greasing, the amount of grease filled during the supplemental greasing, and a count of supplemental greasing operations. The main electric motor 1, for example, is provided with at least one discharge section 20 connected to a position, within the filling chamber 9, that is nearer to the vehicle body than the rotation shaft 5. In this case, within the chamber 9, grease is supplied to the filling chamber 9 from a position that is axially symmetric, relative to the rotation shaft 5, with respect to the position of connection of one of the discharge sections 20 among the at least one discharge section 20.

Figure 9:
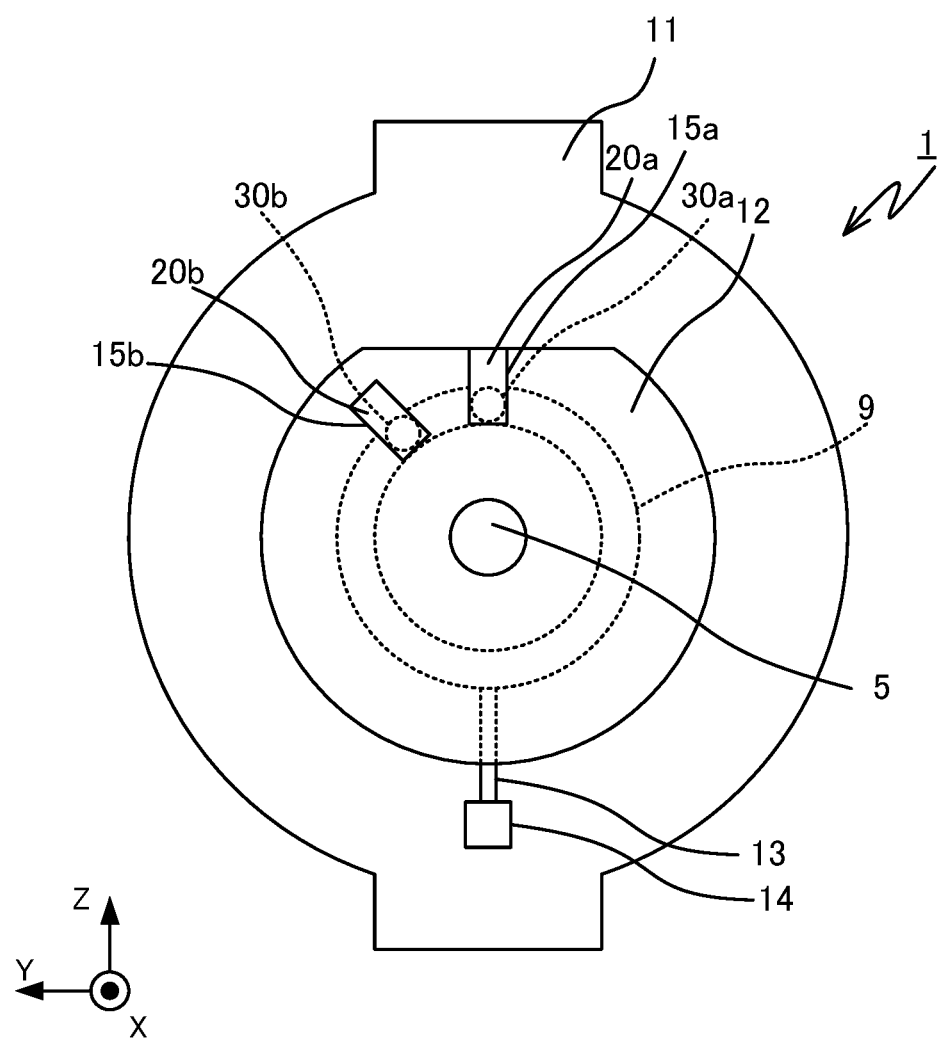
FIG. 9 is a side view of a vehicle main electric motor according to Embodiment 2 of the present disclosure.

FIG. 9 is a side view of the vehicle main electric motor according to Embodiment 2 of the present disclosure. In the example of FIG. 9, the main electric motor 1 is equipped with two discharge sections 20a and 20b. The discharge section 20a, is connected to a position within the filling chamber 9 nearest the vehicle body. Grease is supplied to the filling chamber 9 from a position, within the filling chamber 9, farthest from the vehicle body. The structures of the discharge sections 20a and 20b are the same as the structure of the discharge section 20 of Embodiment 1. A display member 30a is arranged at the initial position 24 of the discharge section 20a. A display member 30b is arranged at the initial position 24 of the discharge section 20b. Display windows 15a and 15b are formed in the bearing cap 12. When the display member 30a reaches the movement position 25 of the discharge section 20a, the display member 30a is visually recognizable through the display window 15a. Further, when the display member 30b reaches the movement position 25 of the discharge section 20b, the display member 30b is visually recognizable through the display window 15b. A timing of arrival of the display member 30a at the movement position 25 in the discharge section 20a due to the supplemental greasing and the timing of arrival of the display member 30b at the movement position 25 in the discharge section 20b due to the supplemental greasing are different from each other.

Figure 10:
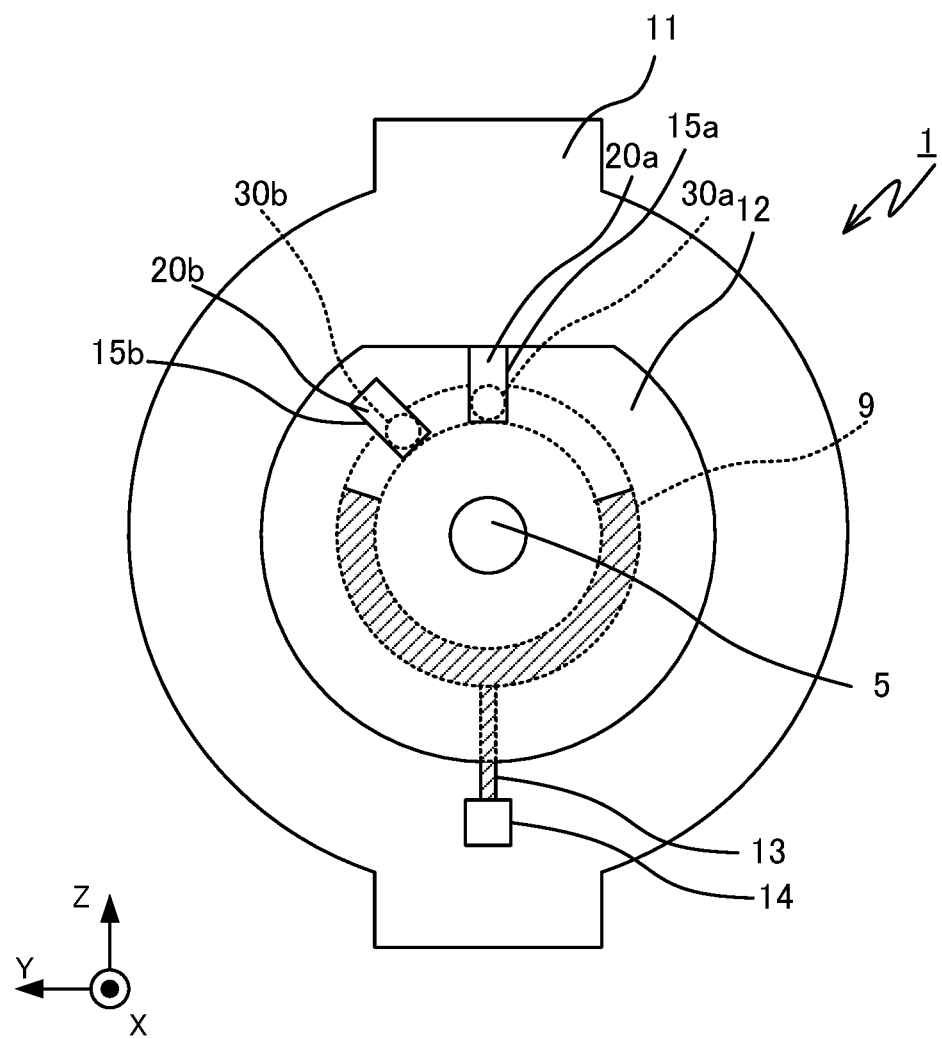
FIG. 10 is a drawing illustrating an example of an initial greasing of the vehicle main electric motor according to Embodiment 2.

FIG. 10 is a drawing illustrating an example of an initial greasing of the vehicle main electric motor according to Embodiment 2. This drawing illustrates a view in the same manner as FIG. 5. As illustrated in FIG. 10, grease does not reach the initial position 24 of the discharge section 20a during the initial greasing, and thus the display member 30a is positioned at the initial position 24, and the display member 30a is not visually recognizable through the display window 15a. In the same manner, grease does not reach the initial position 24 of the discharge section 20b during the initial greasing, and thus the display member 30b is positioned at the initial position 24, and the display member 30b is not visually recognizable through the display window 15b. Due to an inability to visually recognize both the display member 30a and the display member 30b, the maintenance worker can determine that the supplemental greasing is not performed.

Figure 11:
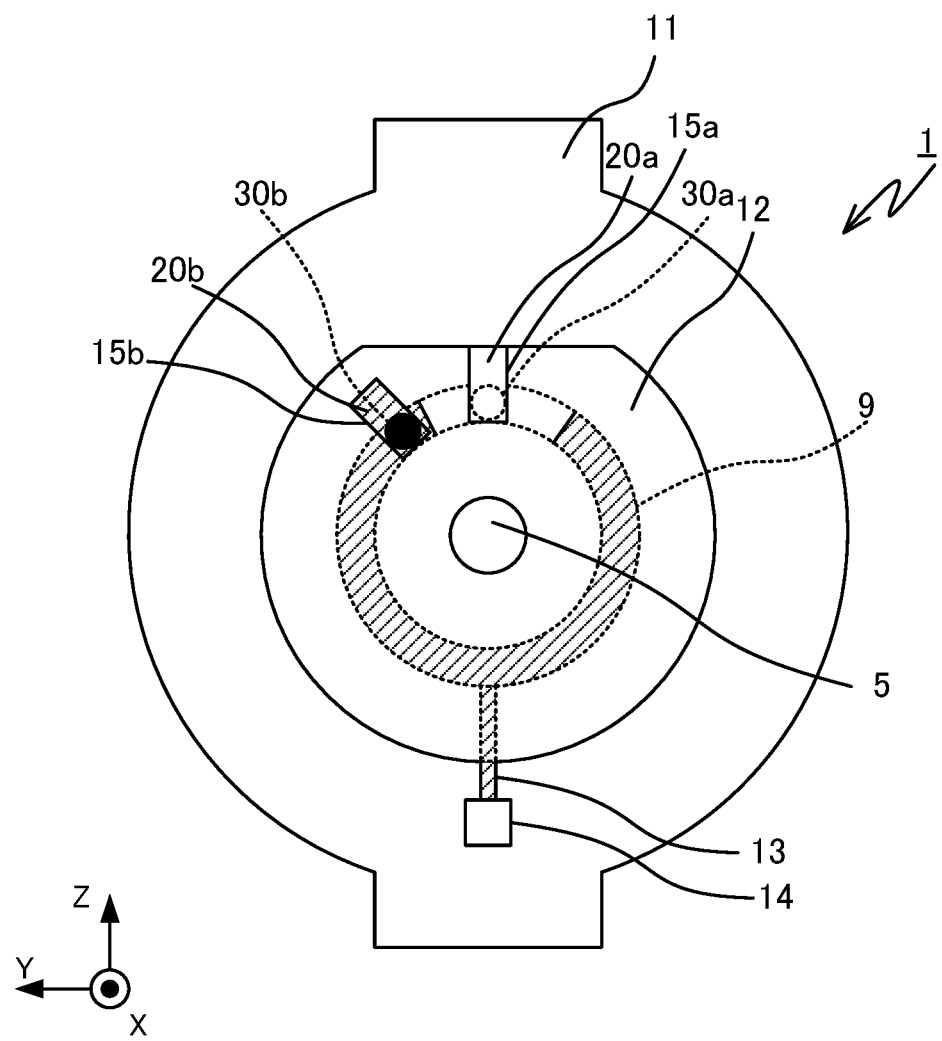
FIG. 11 is a drawing illustrating an example of a first supplemental greasing of the vehicle main electric motor according to Embodiment 2.

FIG. 11 is a drawing illustrating an example of a first supplemental greasing of the vehicle main electric motor according to Embodiment 2. When grease is further supplied to the filling chamber 9 by the first supplemental greasing, and grease entirely fills the first discharge tube 21 and the second discharge tube 22 of the discharge section 20b, grease pushes the display member 30b into the third discharge tube 23 of the discharge section 20b. The display member 30b pushed into the third discharge tube 23 sinks due to gravity and reaches the movement position 25. When the display member 30b reaches the movement position 25, as illustrated in FIG. 11, the display member 30b is visually recognizable through the display window 15b. However, at the time of the first supplemental greasing, the grease does not reach the initial position 24 of the discharge section 20a, and thus the display member 30a is positioned at the initial position 24, and the display member 30a is not visually recognizable through the display window 15a. Due to the ability to visually recognize only the display member 30b, the maintenance worker can determine that the first supplemental greasing is performed.

Figure 12:
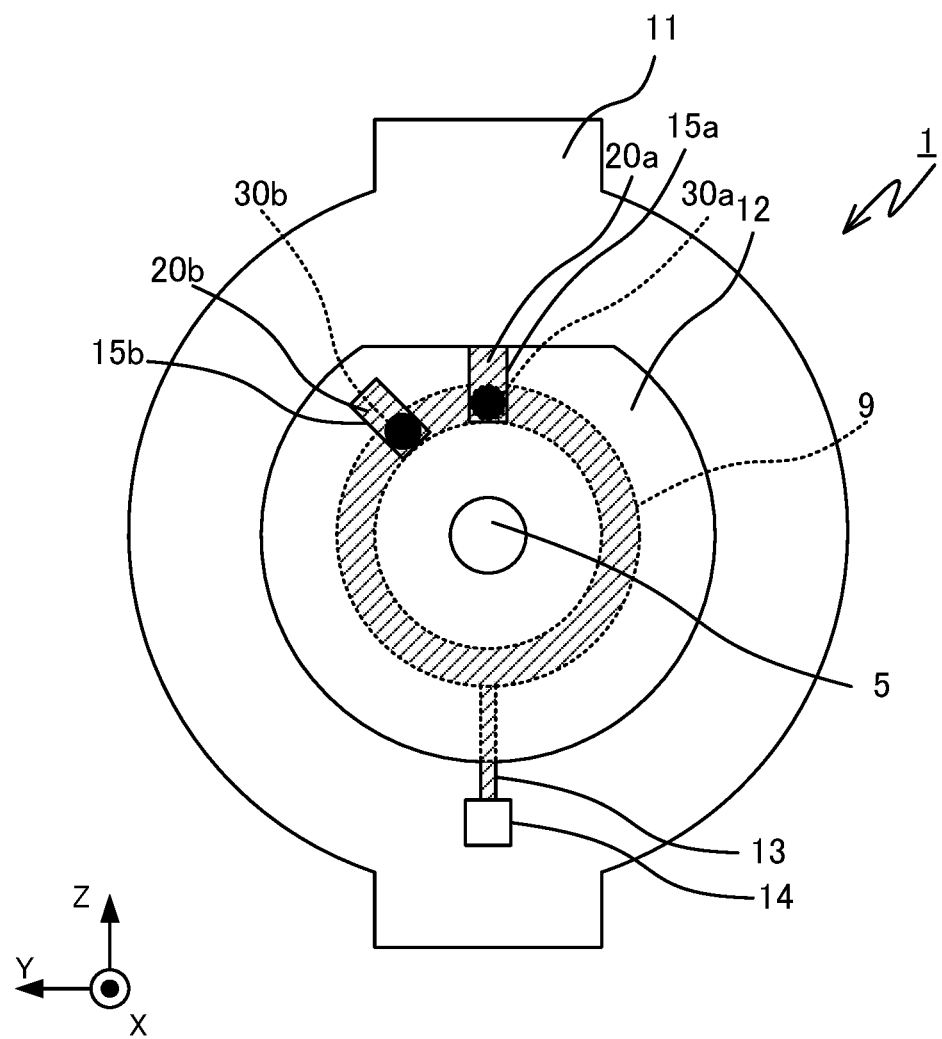
FIG. 12 is a drawing illustrating an example of a second supplemental greasing of the vehicle main electric motor according to Embodiment 2.

FIG. 12 is a drawing illustrating an example of a second supplemental greasing of the vehicle main electric motor according to Embodiment 2. When, due to the second supplemental greasing, the filling chamber 9 is entirely filled with grease and the first discharge tube 21 and the second discharge tube 22 of the discharge section 20a are entirely filled with grease, grease pushes the display member 30a into the third discharge tube 23 of the discharge section 20a. The display member 30a pushed into the third discharge tube 23 sinks due to gravity and arrives at the movement position 25. When the display member 30a reaches the movement position 25, as illustrated in FIG. 12, the display member 30a is visually recognizable through the display window 15a. Due to the ability to visually recognize both of the display members 30a and 30b, the maintenance worker can determine that the second supplemental greasing is performed.

The main electric motor 1 is not limited to being equipped with the discharge sections 20a and 20b, but rather, may be equipped with three or more discharge sections 20 for which timings of arrival of the display member 30 at the movement position 25 due to the supplemental greasing are different from each other.

In the aforementioned manner, the main electric electrical motor 1 according to Embodiment 2 of the present disclosure enables indicating of a status of greasing that includes the count of performances of the supplemental greasing, by providing of multiple discharge sections 20 that have mutually different timings for the arrival of the display member 30 at the movement position 25 due to the supplemental greasing.

Embodiment 3

Figure 13:
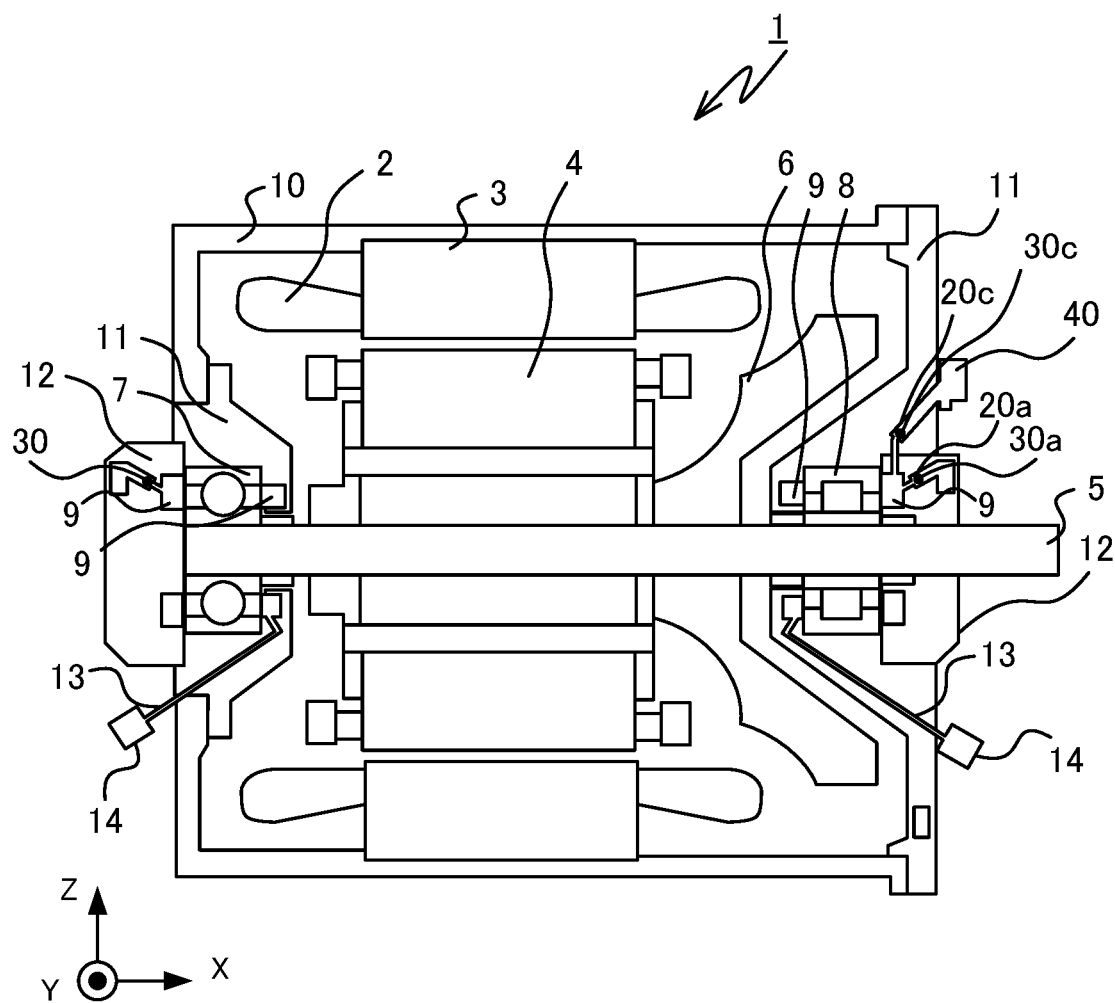
FIG. 13 is a cross-sectional view of a vehicle main electric motor according to Embodiment 3 of the present disclosure.
Figure 14:
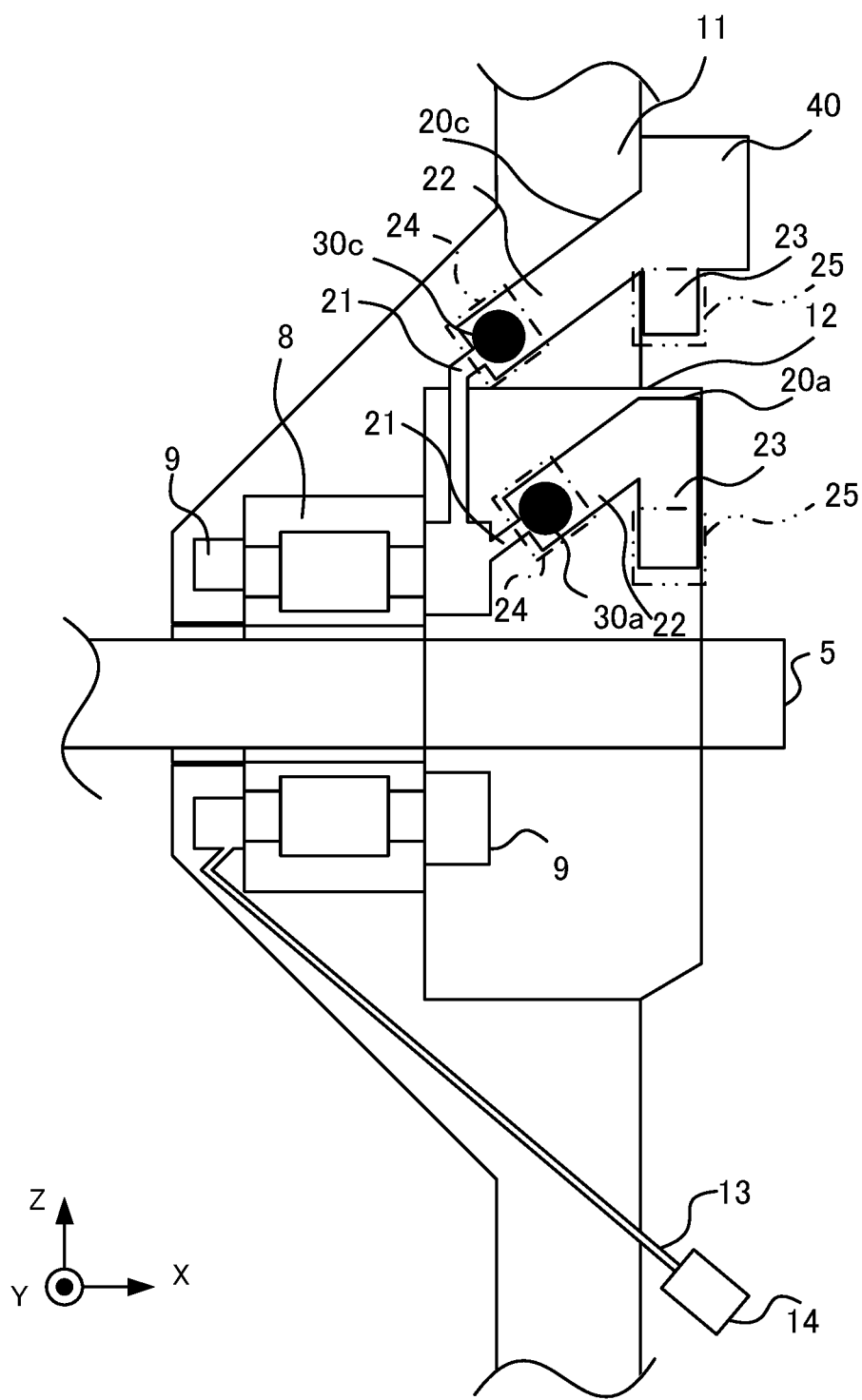
FIG. 14 is a partial cross-sectional view of the vehicle main electric motor according to Embodiment 3.
Figure 15:
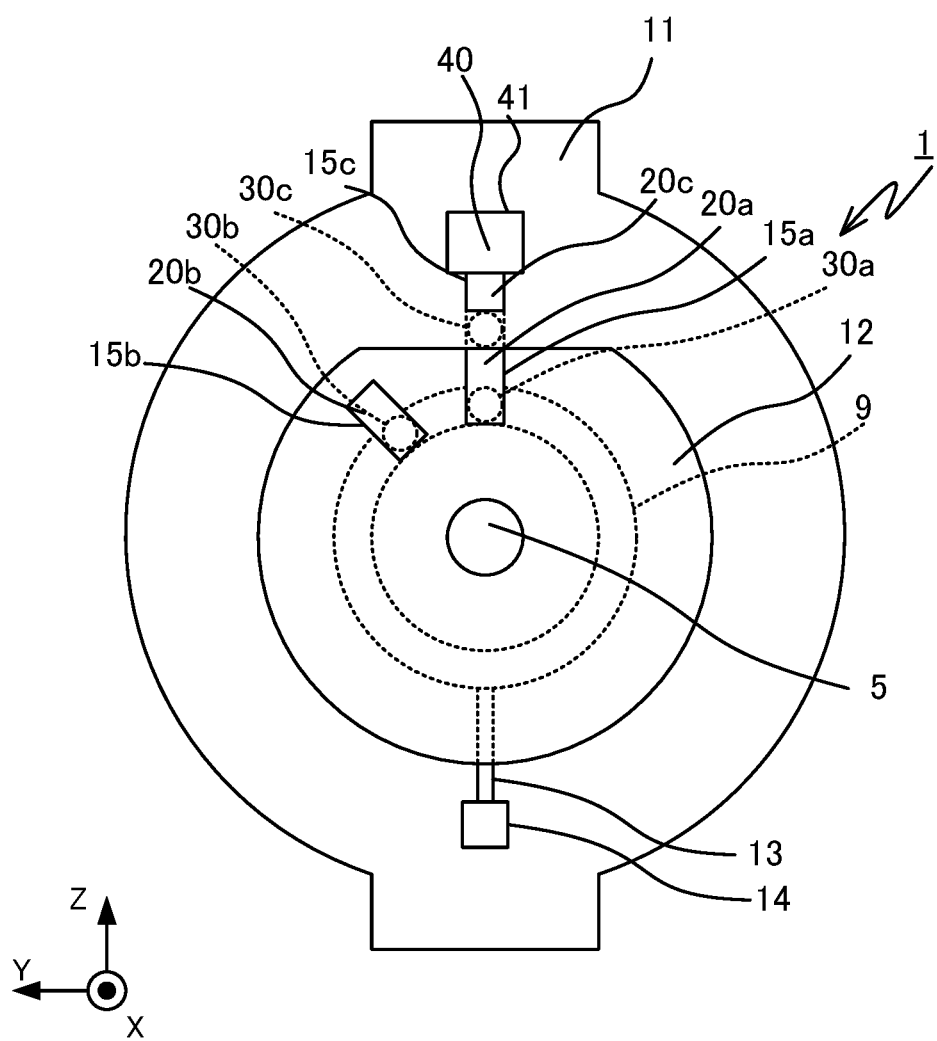
FIG. 15 is a side view of the vehicle main electric motor according to Embodiment 3.

The main electric motor 1 according to Embodiment 3 is further equipped with a discharge chamber that is connected to the filling chamber 9 or the discharge section 20 and into which grease flows from the filling chamber 9 or the discharge section 20. FIG. 13 is a cross-sectional view of the vehicle main electric motor according to Embodiment 3 of the present disclosure. FIG. 14 is a partial cross-sectional view of the vehicle main electric motor according to Embodiment 3. FIG. 15 is a side view of the vehicle main electric motor according to Embodiment 3. In the examples of FIG. 13 through FIG. 15, the main electric motor 1 is equipped with the discharge sections 20a, 20b, and 20c, and further is equipped with a discharge chamber 40 connected to the discharge section 20c. The discharge chamber 40 is connected to the discharge section 20c connected to a position, within the filling chamber 9, nearest the vehicle body. The discharge chamber 40 is connected to the third discharge tube 23 of the discharge section 20c, and grease flows into the chamber 40 from the discharge section 20c. The structures of the discharge sections 20a, 20b, and 20c are similar to the structure of the discharge section 20 of Embodiment 1. The display member 30a is arranged at the initial position 24 of the discharge section 20a. The display member 30b is arranged at the initial position 24 of the discharge section 20b. A display member 30c is arranged at the initial position 24 of the discharge section 20c.

The display windows 15a, 15b, and 15c are formed in the bearing cap 12. When the display member 30a reaches the movement position 25 of the discharge section 20a, the display member 30a is visually recognizable through the display window 15a. When the display member 30b reaches the movement position 25 of the discharge section 20b, the display member 30b is visually recognizable through the display window 15b. When the display member 30c reaches the movement position 25 of the discharge section 20c, the display member 30c is visually recognizable through the display window 15c. The timing of arrival of the display member 30a at the movement position 25 in the discharge section 20a due to the supplemental greasing, the timing of arrival of the display member 30b at the movement position 25 in the discharge section 20b due to the supplemental greasing, and a timing of the arrival of the display member 30c at the movement position 25 in the discharge section 20c due to the supplemental greasing are different from each other. Although the position of connection of the discharge section 20a and the position of connection of the discharge section 20c in the filling chamber 9 are near each other, the first discharge tube 21 of the discharge section 20c is sufficiently longer than the first discharge tube 21 of the discharge section 20a, and thus the timing of the arrival of the display member 30a at the movement position 25 in the discharge section 20a due to the supplemental greasing is different from the timing of the arrival of the display member 30c at the movement position 25 in the discharge section 20c due to the supplemental greasing.

After the display member 30a reaches the movement position 25 in the discharge section 20a, the display member 30b reaches the movement position 25 in the discharge section 20b, and the display member 30c reaches the movement position 25 in the discharge section 20c, then grease flows from the discharge section 20c into the discharge chamber 40. A display window 41 is formed in the discharge chamber 40, and at least a portion of visible light from the exterior arrives in at least a portion inside of the discharge chamber 40. The inflow of grease into the discharge chamber 40 is visually recognizable through the display window 41. In the same manner as the display windows 15a, 15b, and 15c, the display window 41 is formed of a member that is at least partially transparent in visible light. Thus inflow of grease into the discharge chamber 40 is visually recognizable from the exterior of the main electric motor 1. Even if excessive greasing occurs, the grease flows into the discharge chamber 40, and thus excessive filling of the ball bearing 7 and the roller bearing 8 by grease can be suppressed or prevented, and such suppression or prevention enables suppression of exceeding of an appropriate range of temperature of the ball bearing 7 and the roller bearing 8 due to heat of agitation of excessively filling grease.

Figure 16:
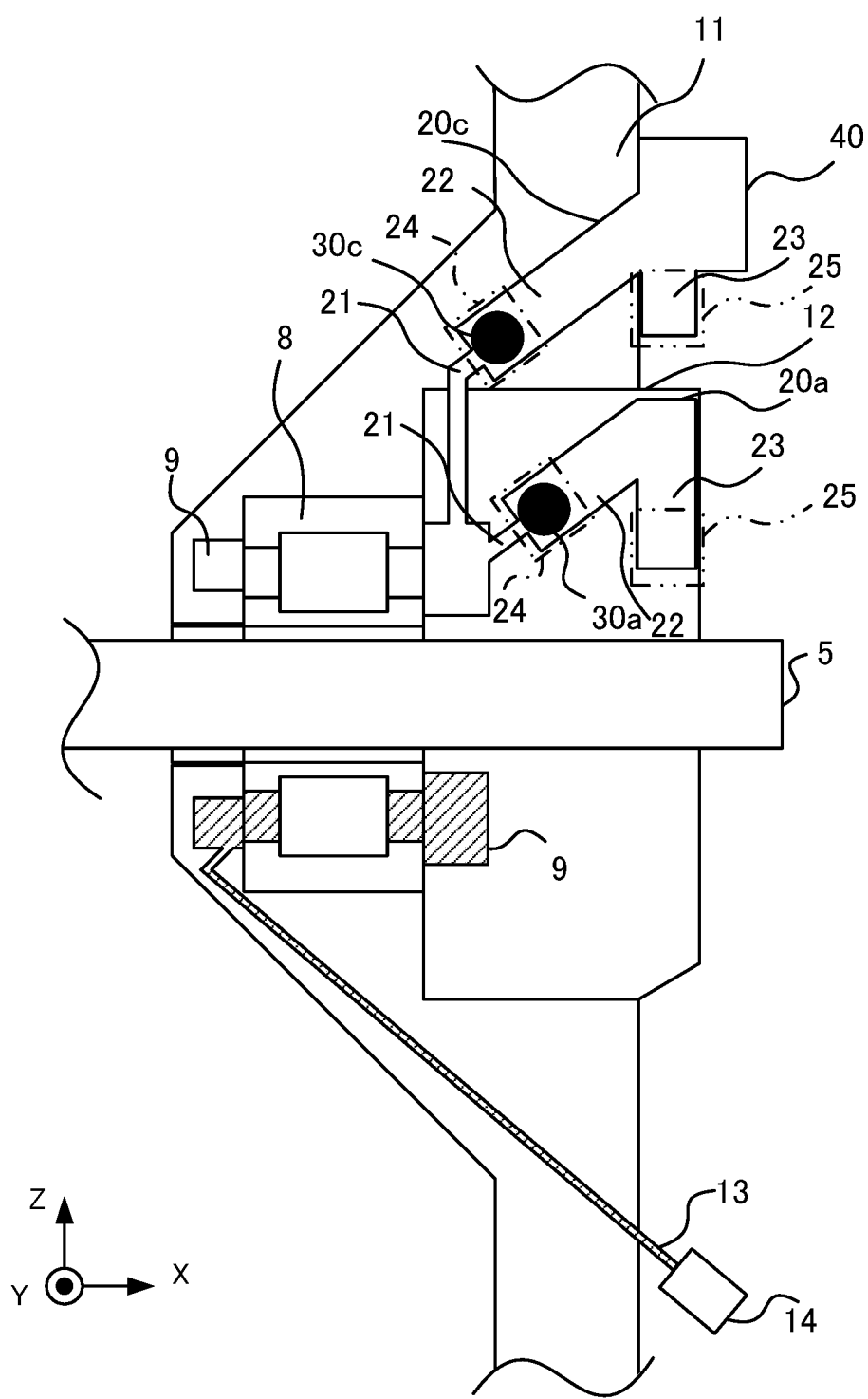
FIG. 16 is a drawing illustrating an example of an initial greasing of the vehicle main electric motor according to Embodiment 3.
Figure 17:
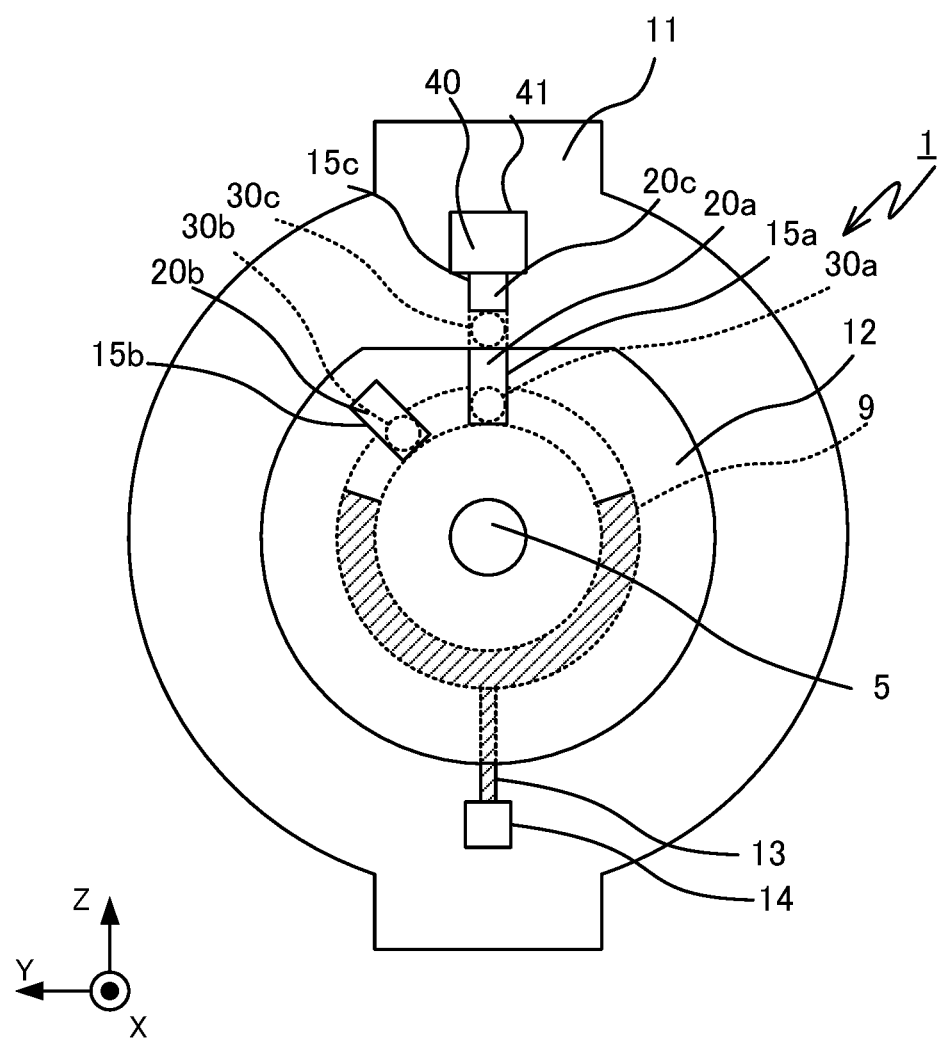
FIG. 17 is another drawing illustrating the example of the initial greasing of the vehicle main electric motor according to Embodiment 3.

FIGS. 16 and 17 are drawings illustrating an example of an initial greasing of the vehicle main electric motor according to Embodiment 3. These drawings illustrate views in the same manner as FIGS. 4 and 5. As illustrated in FIGS. 16 and 17, grease does not reach the initial position 24 of the discharge section 20a during the initial greasing, and thus the display member 30a is positioned at the initial position 24, and the display member 30a is not visually recognizable through the display window 15a. In the same manner, grease does not reach the initial position 24 of the discharge section 20b during the initial greasing, and thus the display member 30b is positioned at the initial position 24, and the display member 30b is not visually recognizable through the display window 15b. In the same manner, grease does not reach the initial position 24 of the discharge section 20c during the initial greasing, and thus the display member 30c is positioned at the initial position 24, and the display member 30c is not visually recognizable through the display window 15c. Since grease does not flow into the discharge section 20c, grease also does not flow into the discharge chamber 40, and lack of inflow of grease into the discharge chamber 40 is visually recognizable through the display window 41. Due to inability to visually recognize any of the display members 30a, 30b, or 30c and due to the ability to visually recognize lack of inflow of grease into the discharge chamber 40, the maintenance worker can determine that the supplemental greasing is not performed.

Figure 18:
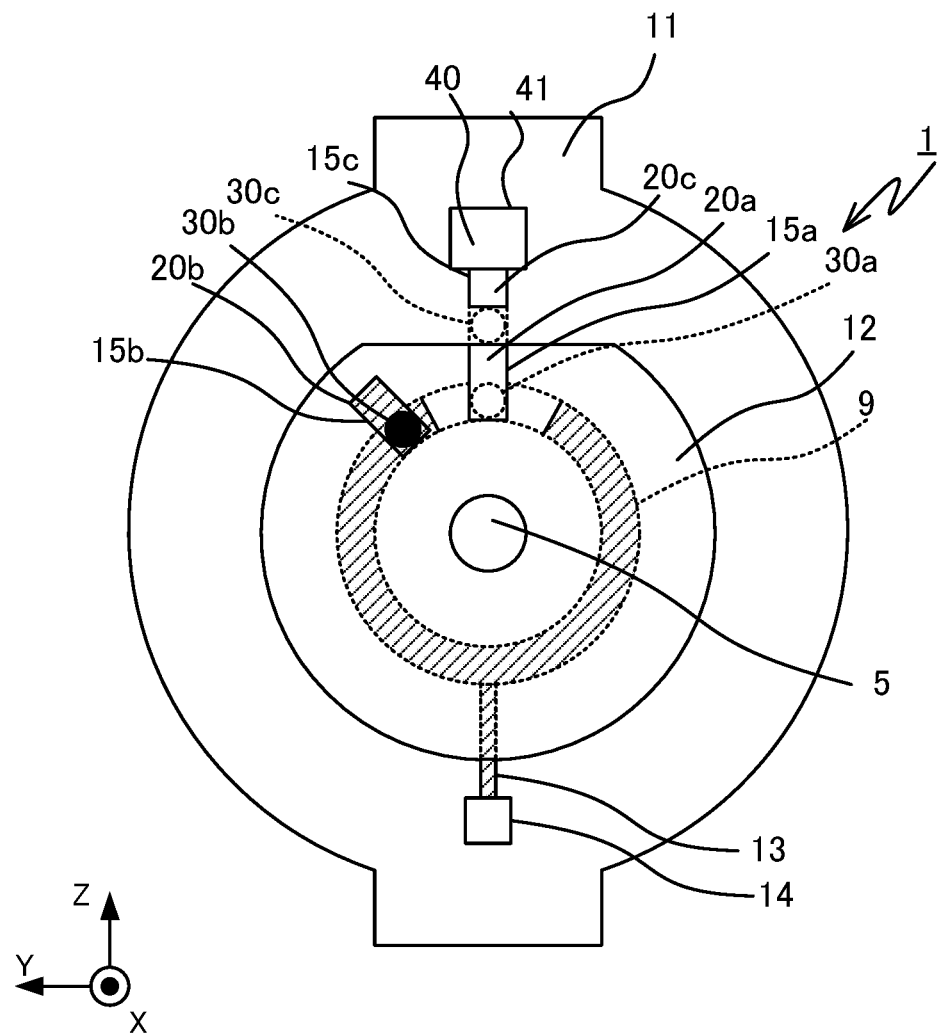
FIG. 18 is a drawing illustrating an example of a first supplemental greasing of the vehicle main electric motor according to Embodiment 3.

FIG. 18 is a drawing illustrating an example of a first supplemental greasing of the vehicle main electric motor according to Embodiment 3. Due to the first supplemental greasing, grease is further filled into the filling chamber 9, and when grease entirely fills the first discharge tube 21 and the second discharge tube 22 of the discharge section 20b, grease pushes the display member 30b into the third discharge tube 23 of the discharge section 20b. The display member 30b pushed into the third discharge tube 23 sinks due to gravity and reaches the movement position 25. When the display member 30b reaches the movement position 25, as illustrated in FIG. 18, the display member 30b is visually recognizable through the display window 15b. However, grease does not reach the initial position 24 of the discharge section 20a during the first supplemental greasing, thus the display member 30a is positioned at the initial position 24, and the display member 30a is not visually recognizable through the display window 15a. In the same manner, grease does not reach the initial position 24 of the discharge section 20c during the first supplemental greasing, thus the display member 30c is positioned at the initial position 24, and the display member 30c is not visually recognizable through the display window 15c. Since grease does not flow into the discharge section 20c, grease also does not flow into the discharge chamber 40, and lack of inflow of grease into the discharge chamber 40 is visually recognizable through the display window 41. Since only the display member 30b is visually recognizable, the maintenance worker can determine that the first supplemental greasing is performed.

Figure 19:
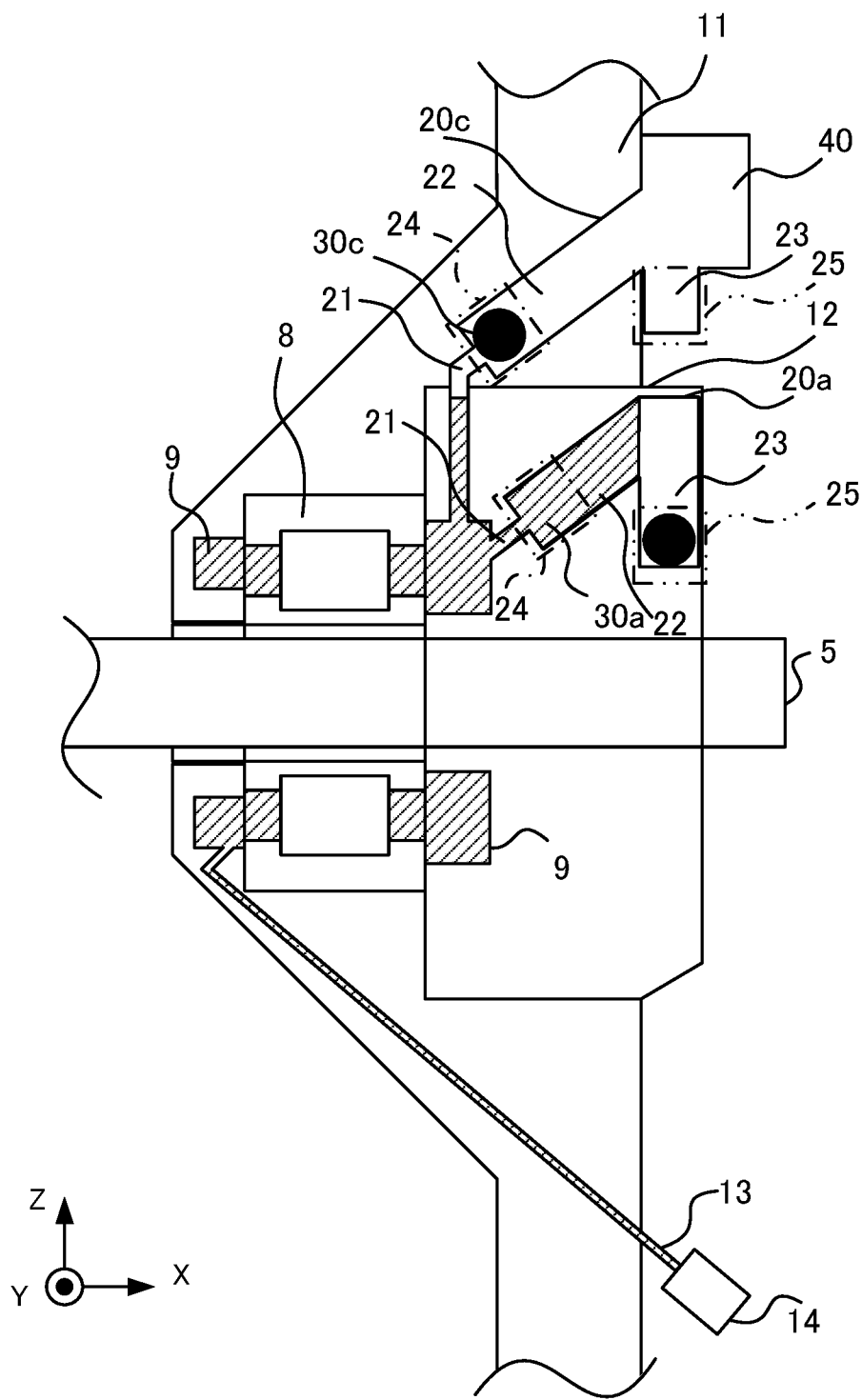
FIG. 19 is a drawing illustrating an example of a second supplemental greasing of the vehicle main electric motor according to Embodiment 3.
Figure 20:
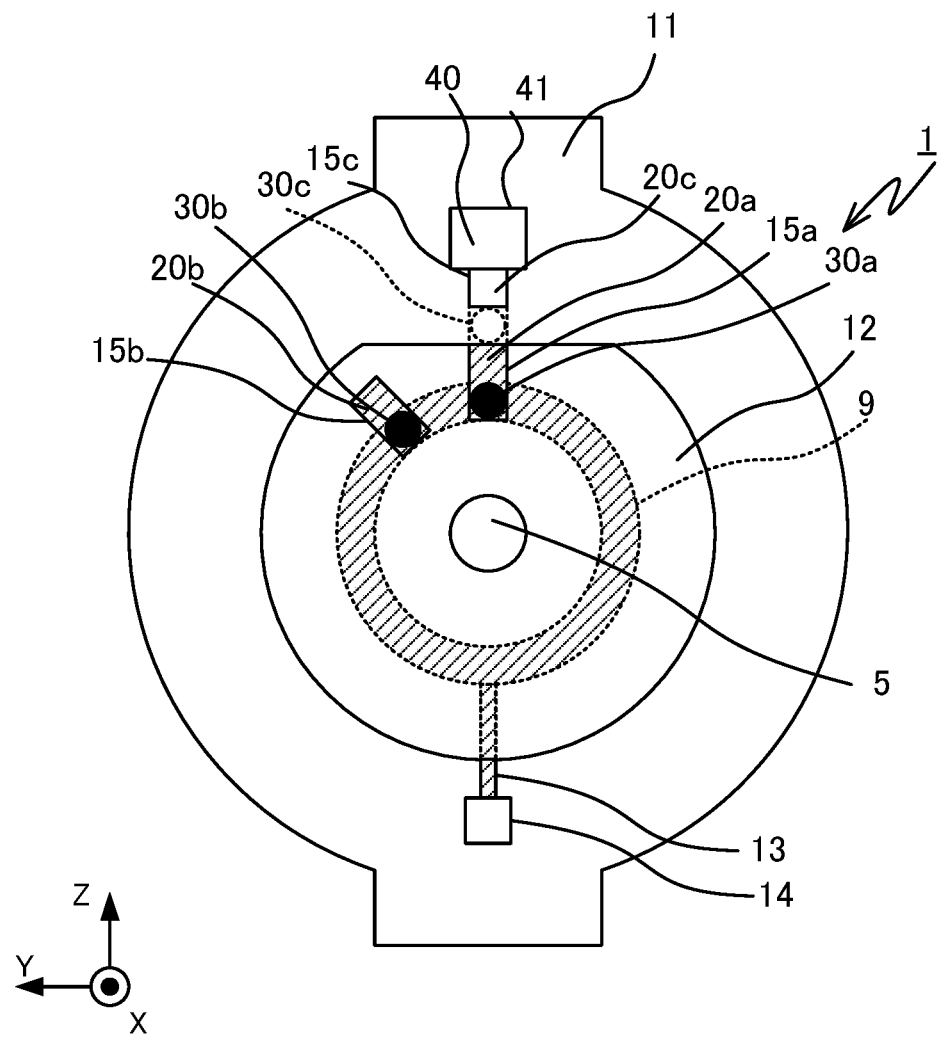
FIG. 20 is another drawing illustrating the example of the second supplemental greasing of the vehicle main electric motor according to Embodiment 3.

FIGS. 19 and 20 are drawings illustrating an example of a second supplemental greasing of the vehicle main electric motor according to Embodiment 3. Due to the second supplemental greasing, grease entirely fills the filling chamber 9, and when grease entirely fills the first discharge tube 21 and the second discharge tube 22 of the discharge section 20a, grease pushes the display member 30a into the third discharge tube 23 of the discharge section 20a. The display member 30a pushed into the third discharge tube 23 sinks due to gravity and reaches the movement position 25. When the display member 30a reaches the movement position 25, as illustrated in FIG. 20, the display member 30a is visually recognizable through the display window 15a. However, grease does not reach the initial position 24 of the discharge section 20c during the second supplemental greasing, thus the display member 30c is positioned at the initial position 24, and the display member 30c is not visually recognizable through the display window 15c. Since grease does not flow into the discharge section 20c, grease also does not flow into the discharge chamber 40, and lack of inflow of grease into the discharge chamber 40 is visually recognizable through the display window 41. Since only the display members 30a and 30b are visually recognizable, the maintenance worker can determine that the second supplemental greasing is performed.

Figure 21:
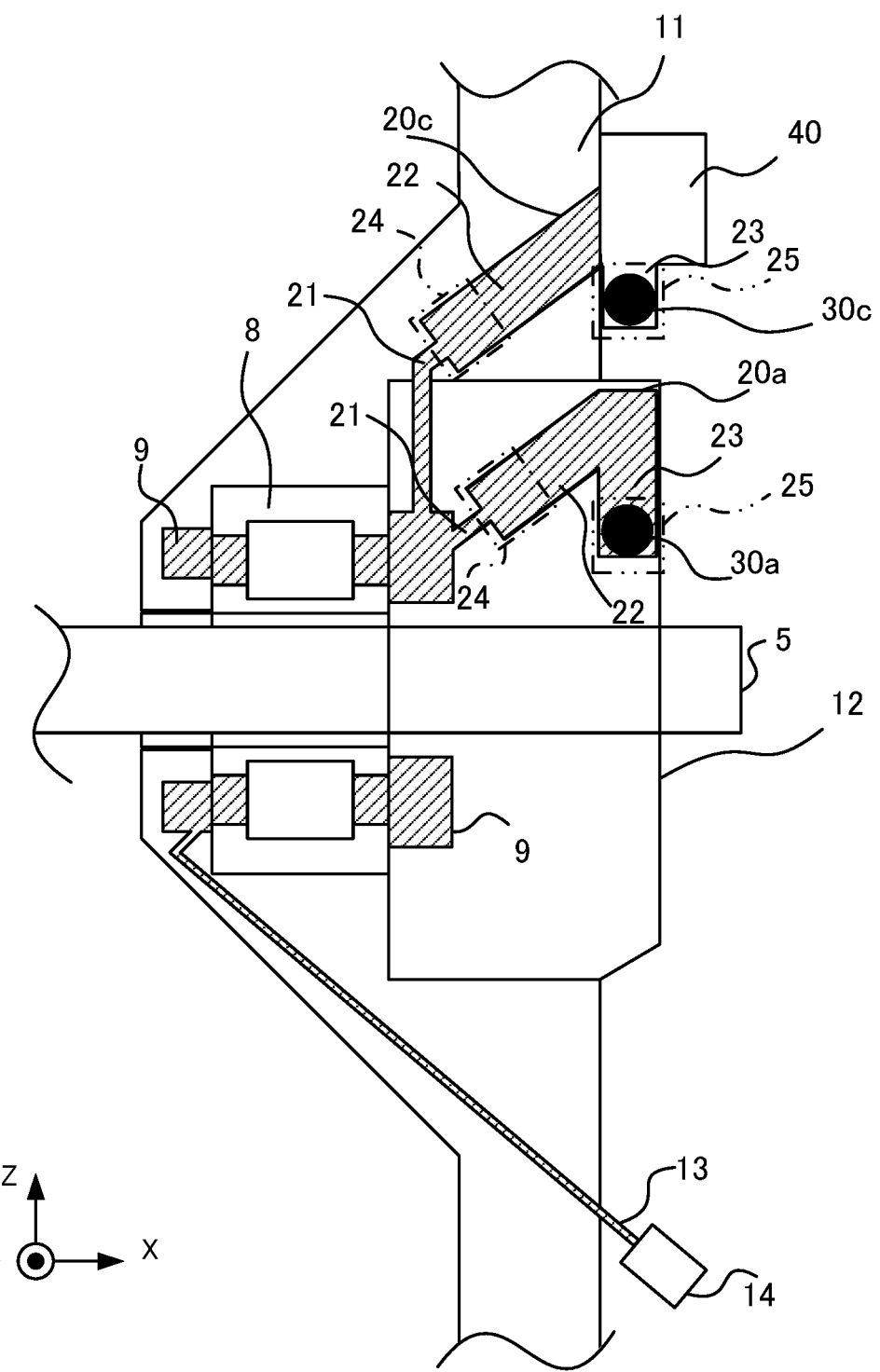
FIG. 21 is a drawing illustrating an example of excessive greasing of the vehicle main electric motor according to Embodiment 3.
Figure 22:
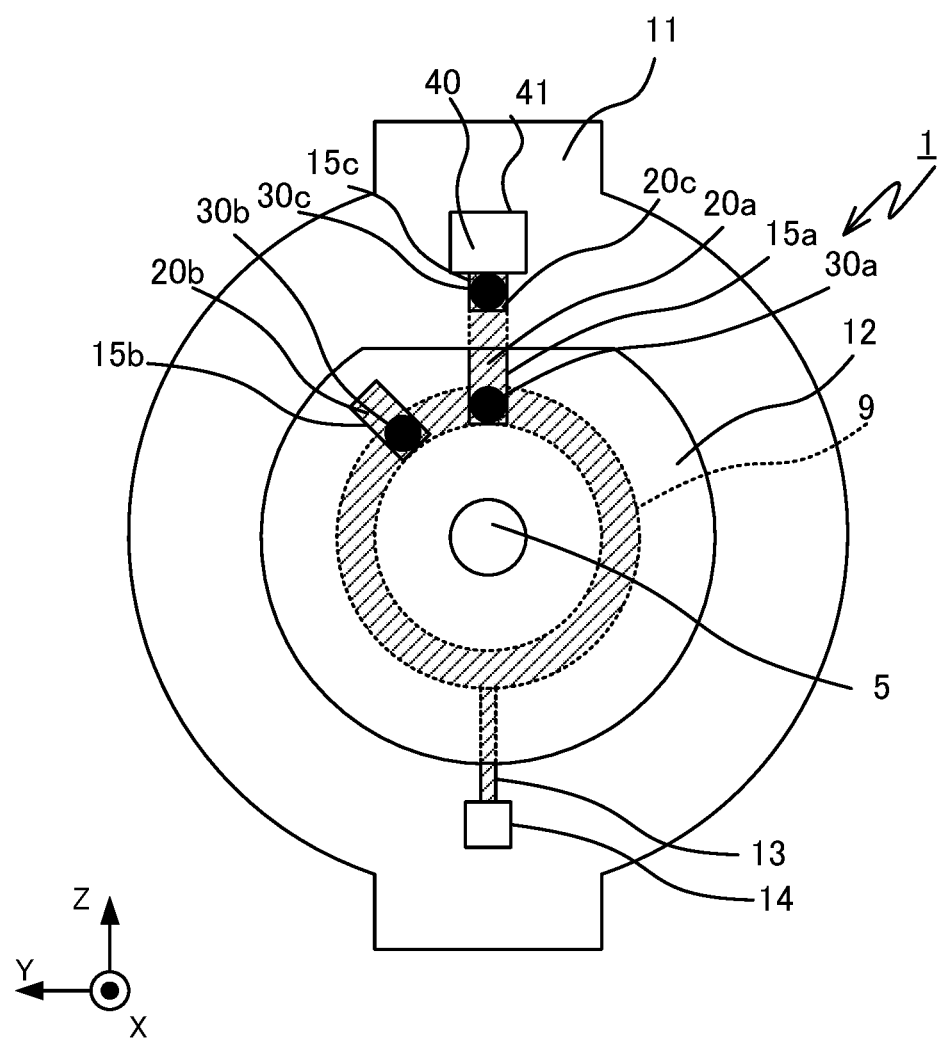
FIG. 22 is another drawing illustrating the example of excessive greasing of the vehicle main electric motor according to Embodiment 3.

FIGS. 21 and 22 are drawings illustrating an example of excessive greasing of the vehicle main electric motor according to Embodiment 3. After performance of the second supplemental greasing, then when grease is further supplied and entirely fills the first discharge tube 21 and the second discharge tube 22 of the discharge section 20c, grease pushes the display member 30c into the third discharge tube 23 of the discharge section 20c. The display member 30c pushed into the third discharge tube 23 sinks due to gravity and reaches the movement position 25. When the display member 30c reaches the movement position 25, as illustrated in FIG. 22, the display member 30c is visually recognizable through the display window 15c. Since the display members 30a, 30b, and 30c are all visually recognizable, the maintenance worker can determine that greasing is performed after performance of the second supplemental greasing and that an excessive greasing state exists.

Figure 23:
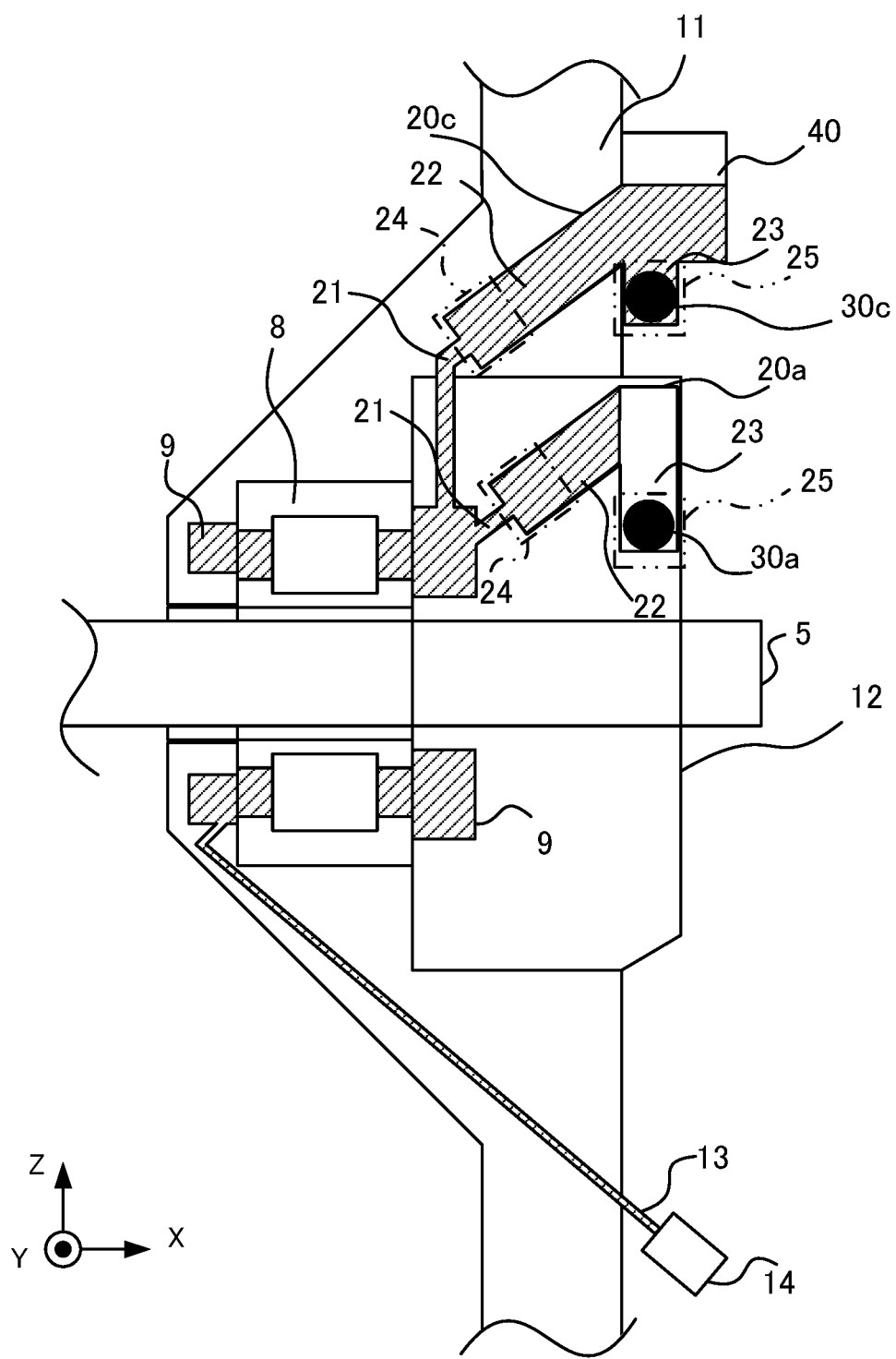
FIG. 23 is yet another drawing illustrating the example of excessive greasing of the vehicle main electric motor according to Embodiment 3.
Figure 24:
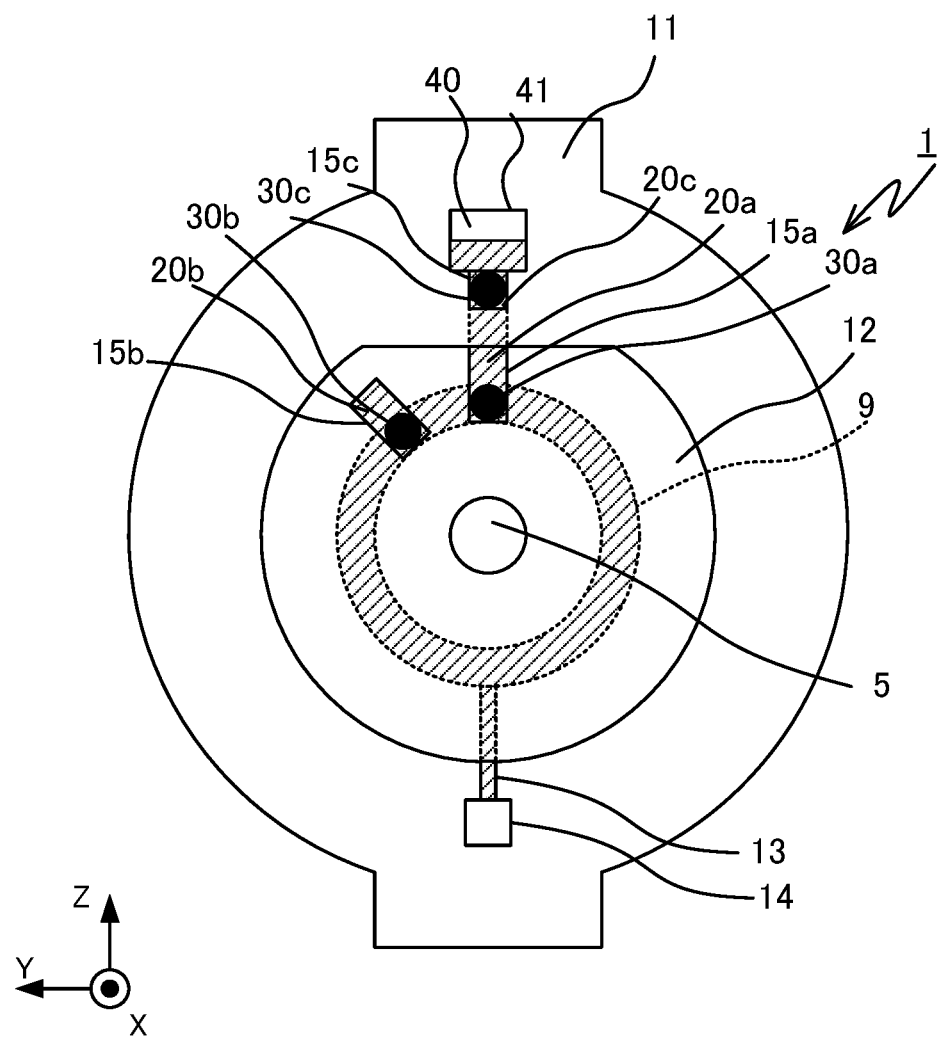
FIG. 24 is yet another drawing illustrating the example of excessive greasing of the vehicle main electric motor according to Embodiment 3.

FIGS. 23 and 24 are drawings illustrating the example of excessive greasing of the vehicle main electric motor according to Embodiment 3. Upon further supply of grease subsequent to the state illustrated in FIGS. 21 and 22, the discharge section 20c is entirely filled with grease, and grease flows into the discharge chamber 40. When grease flows into the discharge chamber 40, the inflow of grease into the discharge chamber 40 is visually recognizable through the display window 41. Due to ability to visually recognize the display members 30a, 30b, and 30c and the inflow of grease into the discharge chamber 40, the maintenance worker can determine that greasing is further performed after the second supplemental greasing and that the excessive greasing state exists. Further, due to the excessively supplied grease flowing into the discharge chamber 40, excessive filling of grease into the roller bearings 8 can be suppressed or prevented, and such suppression enables suppression of exceeding of the appropriate range of temperature of the ball bearing 7 and the roller bearing 8 due to heat of agitation of the excessively filled grease.

Although the discharge section 20c is connected to the discharge chamber 40 in Embodiment 3, the discharge chamber 40 may be connected to the filling chamber 9. In this case, the discharge chamber 40 is connected to the filling chamber 9, for example, by sufficiently lengthening a tube interconnecting the filling chamber 9 and the discharge chamber 40 such that grease flows into the discharge chamber 40 after the display members 30 move to the movement positions 25 in all the discharge sections 20.

Providing of the discharge chamber 40 for the main electric motor 1 according to Embodiment 3 in the aforementioned manner enables suppression of the exceeding of the appropriate range of temperature of the ball bearing 7 and the roller bearing 8 due to excessive greasing.

The present disclosure is not limited to the above embodiments. Multiple configurations among the aforementioned embodiments may be freely combined. For example, the discharge chamber 40 connected to the discharge section 20 may be provided for the main electric motor 1 illustrated in FIG. 1, and the discharge chamber 40 connected to the filling chamber 9 may be provided for the main electric motor 1 illustrated in FIG. 8. The shape of the discharge section 20 is not limited to the aforementioned embodiments, a single discharge section 20 may have multiple retaining parts, and a single discharge section may indicate a status of greasing that includes the count of supplemental greasing operations.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle main electric motor
2 Coil
3 Stator
4 Rotor
5 Rotation shaft
6 Fan
7 Ball bearing
8 Roller bearing
9 Filling chamber
10 Frame
11 Bearing bracket
12 Bearing cap
13 Greasing tube
14 Greasing port
15, 15a, 15b, 15c Display window
20, 20a, 20b, 20c Discharge section
21 First discharge tube
22 Second discharge tube
23 Third discharge tube
24 Initial position
25 Movement position
30, 30a, 30b, 30c Display member
40 Discharge chamber
41 Display window.

The invention claimed is:

1. A vehicle main electric motor comprising:
a bearing disposed around a rotation shaft for transferring power to wheels and driving a vehicle;
a filling chamber formed in contact with the bearing along the rotation shaft, to be filled with a semi-solid lubricant, the filling chamber having a ring shape having a central axis concentric with the rotation shaft;
a greasing tube to be supplied with semi-solid lubricant from a greasing port formed in one end of the greasing tube, and to supply the semi-solid lubricant to the bearing and the filling chamber from another end of the greasing tube; and
a discharge section connected to the filling chamber, for inflow of the semi-solid lubricant from the filling chamber, wherein
a display member having a specific gravity lower than a specific gravity of the semi-solid lubricant is disposed at an initial position within the discharge section, the initial position not being reached by the semi-solid lubricant during an initial greasing by supplying the semi-solid lubricant,
the discharge section comprises a retaining part for stopping, at a movement position, the display member moving in a greasing direction due to pressure of the semi-solid lubricant during a supplemental greasing to supply the semi-solid lubricant performed after the initial greasing, the movement position being a predetermined position within the discharge section, and
at least a portion of visible light from the exterior reaches at least a portion of the movement position.

2. The vehicle main electric motor according to claim 1, wherein
the discharge section is a plurality of discharge sections, and
a timing at which the display member moving in the greasing direction reaches the movement position differs among each of the discharge sections.

3. The vehicle main electric motor according to claim 2, wherein
at least one discharge section is connected to a position, within the filling chamber, nearer to a vehicle body of the vehicle than the rotation shaft, and
the semi-solid lubricant is supplied to the filling chamber from a position, within the filling chamber, axially symmetric, relative to the rotation shaft, with respect to the position of one of the at least one discharge section.

4. The vehicle main electric motor according to claim 3, wherein
the at least one discharge section is connected to a position, within the filling chamber, nearest to the vehicle body, and
the semi-solid lubricant is supplied to the filling chamber from a position, within the filling chamber, farthest from the vehicle body.

5. The vehicle main electric motor according to claim 4, further comprising:
a discharge chamber connected to the filling chamber or the discharge section,
wherein the semi-solid lubricant flows into the discharge chamber after the display members moving in the greasing direction reach the movement position in each of the discharge sections, and
at least a portion of visible light from the exterior reaches at least a portion of an interior of the discharge chamber.

6. The vehicle main electric motor according to claim 5, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

7. The vehicle main electric motor according to claim 3, further comprising:
a discharge chamber connected to the filling chamber or the discharge section,
wherein the semi-solid lubricant flows into the discharge chamber after the display members moving in the greasing direction reach the movement position in each of the discharge sections, and
at least a portion of visible light from the exterior reaches at least a portion of an interior of the discharge chamber.

8. The vehicle main electric motor according to claim 7, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

9. The vehicle main electric motor according to claim 2, further comprising:
a discharge chamber connected to the filling chamber or the discharge section,
wherein the semi-solid lubricant flows into the discharge chamber after the display members moving in the greasing direction reach the movement position in each of the discharge sections, and
at least a portion of visible light from the exterior reaches at least a portion of an interior of the discharge chamber.

10. The vehicle main electric motor according to claim 9, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

11. The vehicle main electric motor according to claim 2, wherein
the discharge section comprises:
(a) a first discharge tube in which a diameter in a cross section perpendicular to a greasing direction of the first discharge tube is smaller than a diameter in a cross section perpendicular to the greasing direction of the display member, an end of the discharge tube connecting to the filling chamber, a vertical direction position of the one end of the discharge tube being lower than a vertical direction position of another end of the discharge tube,
(b) a second discharge tube in which a diameter of a cross section perpendicular to a greasing direction of the second discharge tube is greater than or equal to the diameter in the cross section perpendicular to the greasing direction of the display member, one end of the second discharge tube connecting to the first discharge tube, the display member being disposed at the initial position that is a location of connection with the first discharge tube, a vertical direction position of the one end being lower than the vertical direction position of another end of the second discharge tube,
(c) a third discharge tube having a diameter of a cross section perpendicular to a greasing direction of the third discharge tube is greater than or equal to the diameter of the cross section perpendicular to the greasing direction of the display member, one end of the third discharge tube connecting to the second discharge tube, a vertical direction position of the one end being higher than a vertical direction position of another end of the third discharge tube that is the movement position, and
in a cross section perpendicular to the rotation shaft, shape of the third discharge tube extends, in the cross section, toward a center of the rotation shaft.

12. The vehicle main electric motor according to claim 1, wherein
at least one discharge section is connected to a position, within the filling chamber, nearer to a vehicle body of the vehicle than the rotation shaft, and
the semi-solid lubricant is supplied to the filling chamber from a position, within the filling chamber, axially symmetric, relative to the rotation shaft, with respect to the position of one of the at least one discharge section.

13. The vehicle main electric motor according to claim 12, wherein
the at least one discharge section is connected to a position, within the filling chamber, nearest to the vehicle body, and
the semi-solid lubricant is supplied to the filling chamber from a position, within the filling chamber, farthest from the vehicle body.

14. The vehicle main electric motor according to claim 13, further comprising:
a discharge chamber connected to the filling chamber or the discharge section,
wherein the semi-solid lubricant flows into the discharge chamber after the display members moving in the greasing direction reach the movement position in each of the discharge sections, and at least a portion of visible light from the exterior reaches at least a portion of an interior of the discharge chamber.

15. The vehicle main electric motor according to claim 14, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

16. The vehicle main electric motor according to claim 12, further comprising:
a discharge chamber connected to the filling chamber or the discharge section,
wherein the semi-solid lubricant flows into the discharge chamber after the display members moving in the greasing direction reach the movement position in each of the discharge sections, and
at least a portion of visible light from the exterior reaches at least a portion of an interior of the discharge chamber.

17. The vehicle main electric motor according to claim 16, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

18. The vehicle main electric motor according to claim 1, further comprising:
a discharge chamber connected to the filling chamber or the discharge section,
wherein the semi-solid lubricant flows into the discharge chamber after the display members moving in the greasing direction reach the movement position in each of the discharge sections, and
at least a portion of visible light from the exterior reaches at least a portion of an interior of the discharge chamber.

19. The vehicle main electric motor according to claim 18, wherein
at least one discharge section is connected to a position, within the filling chamber, closest to the vehicle body, and
the discharge chamber is connected to a discharge section for which a timing at which the display member moving in the greasing direction reaches the movement position is latest among the at least one discharge section.

20. The vehicle main electric motor according to claim 1, wherein
the discharge section comprises:
(a) a first discharge tube in which a diameter in a cross section perpendicular to a greasing direction of the first discharge tube is smaller than a diameter in a cross section perpendicular to the greasing direction of the display member, an end of the discharge tube connecting to the filling chamber, a vertical direction position of the one end of the discharge tube being lower than a vertical direction position of another end of the discharge tube,
(b) a second discharge tube in which a diameter of a cross section perpendicular to a greasing direction of the second discharge tube is greater than or equal to the diameter in the cross section perpendicular to the greasing direction of the display member, one end of the second discharge tube connecting to the first discharge tube, the display member being disposed at the initial position that is a location of connection with the first discharge tube, a vertical direction position of the one end being lower than the vertical direction position of another end of the second discharge tube,
(c) a third discharge tube having a diameter of a cross section perpendicular to a greasing direction of the third discharge tube is greater than or equal to the diameter of the cross section perpendicular to the greasing direction of the display member, one end of the third discharge tube connecting to the second discharge tube, a vertical direction position of the one end being higher than a vertical direction position of another end of the third discharge tube that is the movement position, and
in a cross section perpendicular to the rotation shaft, shape of the third discharge tube extends, in the cross section, toward a center of the rotation shaft.

* * * * *